US012285084B1

(12) United States Patent
Demirjian

(10) Patent No.: US 12,285,084 B1
(45) **Date of Patent: *Apr. 29, 2025**

(54) WEARABLE DISPENSER FOR APPLICABLE SOLUTIONS

(71) Applicant: Greg Demirjian, Fairfax Station, VA (US)

(72) Inventor: Greg Demirjian, Fairfax Station, VA (US)

(73) Assignee: Wearspray, Inc., Fairfax Station, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,964

(22) Filed: Aug. 3, 2023

Related U.S. Application Data

(63) Continuation of application No. 17/569,240, filed on Jan. 5, 2022, now Pat. No. 11,717,063, which is a continuation-in-part of application No. 17/322,535, filed on May 17, 2021, now Pat. No. 11,458,215.

(60) Provisional application No. 63/026,085, filed on May 17, 2020.

(51) Int. Cl.
*A44C 5/00* (2006.01)
*B05B 11/04* (2006.01)

(52) U.S. Cl.
CPC ............ *A44C 5/003* (2013.01); *B05B 11/048* (2013.01)

(58) Field of Classification Search
CPC ...... A61L 2/0088; A61L 2/16; A61L 2202/15; A61L 2202/16; A44C 5/18; A45F 5/00; A45F 2005/008; A47K 5/00; A47K 5/1201; A47K 5/1211
See application file for complete search history.

(56) References Cited

U.S. PATENT DOCUMENTS

| | | | |
|---|---|---|---|
| 5,924,601 | A | 7/1999 | Chen |
| 7,316,332 | B2 | 1/2008 | Powers et al. |
| 8,950,632 | B2 | 2/2015 | Ciavarella et al. |
| 9,238,539 | B2 | 1/2016 | Lynch |
| 9,347,749 | B2 | 5/2016 | Olah |
| 9,578,935 | B2 | 2/2017 | Horgan |
| 9,878,350 | B2 | 1/2018 | Landy |
| 9,888,816 | B1 | 2/2018 | Shaukat et al. |
| 10,264,859 | B2 | 4/2019 | Parker et al. |
| 10,996,028 | B2 | 5/2021 | Jimenez |
| 11,298,712 | B2 | 4/2022 | Swain |
| 2004/0162534 | A1 | 8/2004 | Powers et al. |
| 2006/0219742 | A1 | 10/2006 | Chen |
| 2008/0110773 | A1 | 5/2008 | Greep |
| 2008/0230560 | A1 | 9/2008 | Powers et al. |
| 2011/0155765 | A1 | 6/2011 | Properzi |
| 2015/0158042 | A1 | 6/2015 | Parker et al. |
| 2016/0044997 | A1 | 2/2016 | Horgan |
| 2017/0122708 | A1 | 5/2017 | Gorinas et al. |
| 2017/0156454 | A1 | 6/2017 | Abadi et al. |
| 2020/0245822 | A1 | 8/2020 | Chacon, Jr. |

*Primary Examiner* — Vishal Pancholi
(74) *Attorney, Agent, or Firm* — NEO IP

(57) ABSTRACT

A wearable apparatus, including a wristband, is able to dispense a substance, such as hand sanitizer, sunscreen, or perfume, for quick and easy application to the skin of a user. The wearable apparatus includes a refillable reservoir with a detachable cap forming an air-tight seal for the reservoir. Pressure applied to a surface of the refillable reservoir causes the substance within the reservoir to release through a nozzle in a side wall of the apparatus.

20 Claims, 25 Drawing Sheets

FIG. 24
610
614
612
CTRL
GPS
LIGHT
Lo 11:59
Tue
15
MENU
UP
10:10
38
30d
DOWN
ABC
BACK
SET

WEARABLE DISPENSER FOR APPLICABLE SOLUTIONS

CROSS REFERENCES TO RELATED APPLICATIONS

This application is related to and claims priority from the following US patents and patent applications. This application is a continuation of U.S. patent application Ser. No. 17/569,240, filed Jan. 5, 2022, which is a continuation-in-part of U.S. patent application Ser. No. 17/322,535, filed May 17, 2021 and issued as U.S. Pat. No. 11,458,215, which claims priority to U.S. Provisional Patent Application No. 63/026,085, filed May 17, 2020, each of which is incorporated herein by reference in its entirety.

BACKGROUND OF THE INVENTION

1. Field of the Invention

The present invention relates to wearable dispensing devices, and more specifically to wearable devices for dispensing hand sanitizer, sunscreen, perfume, and/or other fluids, colloids, or solutions applicable to a user's skin.

2. Description of the Prior Art

It is generally known in the prior art to provide containers for holding and dispensing hand sanitizer, sunscreen, perfume, and other fluids. It is further known to provide wearable containers for holding such fluids in the form of bracelets, necklaces, and/or keychain attachments.

Prior art patent documents include the following:

U.S. Pat. No. 9,888,816 for Wearable fluid-dispensing apparatus by inventors Shaukat et al., filed Jun. 1, 2016 and issued Feb. 13, 2018, discloses an antibacterial dispensing bracelet including a frame having a receptacle receiving a removable cartridge defining an interior reservoir for containing a quantity of antibacterial fluid. A finger-activated pump assembly is mounted to the frame proximate to the receptacle and engages an extraction port in the cartridge for extracting antibacterial fluid. The pump assembly further defines a nozzle port for dispensing the antibacterial fluid therethrough by activation of a piston of the pump assembly being mounted in a housing of the pump assembly and movable between raised and depressed positions. The pump assembly also includes a spring biasing the piston to the raised position and a conduit extending in the cartridge to the extraction port thereof. The conduit, housing, and piston define a fluid pathway between the cartridge and nozzle port. A wristband extends from each side of the frame for securing about an arm of a user.

US Patent Publication No. 2011/0155765 for Handy san systems by inventor Properzi, filed Dec. 22, 2010 and published Jun. 30, 2011, discloses a hand sanitizer dispenser that can be worn around the wrist like a bracelet. This item allows individuals user-convenience to guard against bacteria and germs to keep their hands clean to promote personal hygiene. The comfortable bracelet dispenser allows for freedom of movement and easy access to hand sanitizer liquid. The device is comprised of a hollow wristband made of plastic or other suitable biodegradable compounds. There is an opening on one side of the bracelet where the sanitizer can be dispensed, with a cap that hinges open and closed. Users open the cap and then slide the dispenser lever with one hand allowing the device to be activated. On the other side of the bracelet may be a small air pump button that can be pressed to increase internal pressure enabling the liquid to flow out of the device easier. The device is refillable and/or disposable.

U.S. Pat. No. 9,578,935 for Antiseptic bracelet by inventor Horgan, filed Oct. 13, 2015 and issued Feb. 28, 2017, discloses a wearable bracelet containing an antiseptic solution that can be selectively dispensed by a user as desired to assist in disinfecting the user's hands or other surface. The antiseptic bracelet is to be worn on and around user's wrist near the base of the user's palm and comprises a bracelet band that is connected to opposing sides of a dispensing pod, forming a loop which can be placed around a user's wrist. The dispensing pod includes a hollow interior forming an internal reservoir and a dispensing tip positioned in an outlet channel. The internal reservoir enables the dispensing pod to hold an antiseptic solution and dispensing tip enables a user to selectively dispense a portion of the solution in the dispensing pod.

US Patent Publication No. 2020/0245822 for Hygiene Maintenance Wristband by inventor Chacon, filed Feb. 4, 2020 and published Aug. 6, 2020, discloses a hygiene maintenance wristband that is an apparatus that allows a user to easily maintain the hygiene while on-the-go. The apparatus includes a band, a first casing, a second casing, a solution dispenser, and a clasp mechanism. The band attaches the first casing and the second casing around the wrist of a user. The first casing houses the solution dispenser. The clasp mechanism is integrated within the second casing in order to connect and disconnect the band. The clasp mechanism also adjusts the overall length of the band around a wrist. The apparatus further includes a dispenser-release mechanism so that the solution dispenser may be released from the first casing. The apparatus preferably includes a portable computing device as well in order to further monitor the wellbeing of the user. The apparatus further includes a floss-dispensing mechanism in order to maintain oral hygiene.

U.S. Pat. No. 10,264,859 for Liquid dispenser device that can be worn as jewelry by inventors Parker et al., filed Nov. 27, 2017 and issued Apr. 23, 2019, discloses a dispenser having a bladder assembly and an outer shell. The outer shell opens to receive the bladder assembly, which includes a flexible bladder, neck and valve. The outer shell has an opening, exposing the enclosed flexible bladder to enable a user to apply pressure directly on the flexible bladder through the opening. When a user applies pressure to the flexible bladder, liquid passes through the valve for use. In an alternative embodiment, a flexible bladder is contained within a watch base. The watch base includes a flexible watch face that when pressed by a user, applies pressure to the flexible bladder. In yet another embodiment, a pump/valve device in combination with hollow tubes that store liquid enables a user to press a flexible dome on the device to release fluid stored in the hollow tubes.

US Patent Publication No. 2008/0110773 for Wearable devices for dispensing flowable agents by inventor Greep, filed Nov. 14, 2007 and published May 15, 2008, discloses a wearable device structured to provide flowable agent for application to a surface, such as the body of a human, or other surfaces, the device being structured to attach to the body or to an item of clothing so that the source of flowable agent is readily accessible. The wearable device may be formed as a pen-like structure, as an item of jewelry or as a decal that can be worn on clothing. One embodiment of the wearable device further includes a self-closing check valve to prevent dispensing of flowable agent, and may include a metering device, locking device and additional safety features.

U.S. Pat. No. 7,316,332 for Wearable skin treatment device by inventors Powers et al., filed Aug. 10, 2004 and issued Jan. 8, 2008, discloses some form of skin treatment when on the go. Such treatments include disinfectant, sunscreens, medications, and moisturizing lotions. The reference comprises convenient portable skin treatment dispensers in the form of neck-worn and disposable wrist-worn devices. The devices are convenient to use, unobtrusive and can even be disposable. Ease of manufacture is facilitated in various embodiments which include self-sealing diaphragm valves.

U.S. Pat. No. 5,924,601 for Wrist sprayer by inventor Chen, filed Jan. 6, 1998 and issued Jul. 20, 1999, discloses a wrist type instantaneous sprayer comprising a pressurized storage tank, a button to release a gas and an adjustable wrist strap. For various purposes, the pressurized storage tank is filled with a compressed gas for the button to controllably release on an appropriate timing, thus facilitating for short distance defense, or for rescuing in case of first aid, or for escaping from a fire in time.

U.S. Pat. No. 8,950,632 for Wearable dispenser by inventors Ciavarella et al., filed Dec. 2, 2011 and issued Feb. 10, 2015, discloses a wearable dispenser having an elongate body having a first end and a second end and extending from the first end to the second end in an arc forming at least a portion of an ellipse, oval or circle and extending through greater than 180 degrees so as to fit over a wrist. A product is retained interiorly of the body, and a pump assembly fluidly communicates with the product in the body. The pump assembly includes a movable dispensing tip that, upon reciprocal movement, dispenses a dose of product from the pump assembly and draws another dose of product into the pump assembly.

U.S. Pat. No. 9,878,350 for Wristband wearable fluid application device by inventor Landy, filed Jul. 31, 2016 and issued Jan. 30, 2018, discloses a wristband fluid application device for applying a fluid to a surface and removing the same as necessary. The device may generally comprise a fluid applicator and a textile base member for sanitizing gym equipment, wiping windows, applying sunscreen, and the like. The fluid applicator may comprise a spray applicator. In one embodiment, the fluid applicator may be used by gym patrons to sanitized gym equipment before and/or after use. The fluid applicator may also be used to clean other surfaces including but not limited to household windows, vehicle windows, and the like. Additional embodiments of the reference may also be used either to apply sunscreen on a user or as a fishing towel to clean hands and remove odor.

US Patent Publication No. 2017/0156454 for Wearable Hand Sanitizer Apparatus by inventors Abadi et al., filed Dec. 4, 2015 and published Jun. 8, 2017, discloses a wearable hand sanitizer apparatus for dispensing sanitizer fluid including a wristband wearable about a user's wrist. A reservoir in the wristband holds sanitizing fluid. An outlet nozzle selectively dispenses a predetermined quantity of the sanitizing fluid. A dispensing assembly is situated intermediate the outlet nozzle and the reservoir and is in communication with the reservoir for selectively dispensing on demand the sanitizer fluid from the reservoir to a place outside the wristband. A first actuator is normally biased to an unactuated configuration but, when actuated, allows the sanitizer fluid to pass through the dispensing assembly to the outlet nozzle. A second actuator in communication with the first actuator is normally biased to an unactuated configuration that prevents the first actuator from being actuated but, when actuated, allows the first actuator to be actuated to allow sanitizer fluid to pass through the dispensing assembly to the outlet nozzle.

US Patent Publication No. 2006/0219742 for Bracelet with a cosmetic container by inventor Chen, filed Apr. 5, 2005 and published Oct. 5, 2006, discloses a bracelet including a first semi-ring with a first pivot end and a first non-pivot end opposed to the first pivot end. A second semi-ring has a second pivot end pivotally mounted to the first pivot end, a second non-pivot end opposed to the second pivot end, a positioning member provided between the first and second pivot ends to prevent the two pivot ends from freely pivoting, and a channel defined along an inner circumference of the second semi-ring. A cosmetic container has a containing body with a chamber detachably mounted in the channel. An open end is communicated with the chamber and extends out from the second non-pivot end of the second semi-ring. A plug is mounted at the open end. Whereby, cosmetic such as scent can be contained in the container and sprayed out from the plug.

U.S. Pat. No. 10,996,028 for Pepper spray bracelet assembly by inventor Jimenez, filed May 17, 2019 and issued May 4, 2021, discloses a pepper spray bracelet assembly including a bracelet worn around a user's wrist. The bracelet has a dock is integrated into the bracelet and a nozzle is in fluid communication with the dock. A cartridge is positionable in the dock such that the cartridge is in fluid communication with the nozzle. The cartridge contains pepper spray and the cartridge releases the pepper spray through the nozzle when the cartridge is turned on to direct the pepper spray at an assailant. A button is movably coupled to the bracelet and the button turns the cartridge on when the button is depressed. A speaker is coupled to the bracelet to emit an audible alarm outwardly therefrom. The speaker is electrically coupled to the button and the speaker is turned on when the button is depressed to alert bystanders that the user of the bracelet is under duress.

U.S. Pat. No. 9,347,749 for Fashionable, compact, wearable, instant use pepper spray self-defense accessory by inventor Olah, filed Feb. 13, 2015 and issued May 24, 2016, discloses a self-defense apparatus comprising a wristband, an upper compartment with a circular recess attached to the wristband, and a clasp system. The upper compartment holds a small cylindrical canister containing a self-defense spray, the nozzle of the canister aligns with the circular recess. The wristband is comprised of an inner end and an outer end. The clasp system is comprised of an outer portion and an inner portion, wherein the outer portion is located on the outer end of the wristband, and the inner portion located on the inner end of the wristband. The outer portion of the clasp system attaches to the inner portion of the clasp system.

US Patent Publication No. 2017/0122708 for Wearable personal protection spray device with trigger and safety mechanism by inventors Gorinas et al., filed Jan. 18, 2017 and published May 4, 2017, discloses a fluid dispenser apparatus including a sealed fluid reservoir container storing a volume of a fluid under a pressure higher than at least 140 psi, a nozzle juxtaposed with the sealed fluid reservoir container, and a trigger mechanically coupled with the nozzle. The nozzle has a fluid inlet that is configured to fluidly couple with the volume of the sealed fluid reservoir container and a fluid outlet configured to emit a stream of the fluid. When activated the fluid inlet of the nozzle is caused to permanently unseal the sealed fluid reservoir container and relate substantially all the fluid under pressure in the volume through the fluid outlet as the stream in a direction determined by a user.

SUMMARY OF THE INVENTION

The present invention relates to wearable dispensing devices, and more specifically to wearable devices for dispensing hand sanitizer, sunscreen, perfume, and/or other fluids, colloids, or solutions applicable to a user's skin.

It is an object of this invention to provide a waterproof, easily refillable wearable device able to spray hand sanitizer or another fluid or colloid for easy application to a user's skin.

In one embodiment, the present invention is directed to an apparatus for dispensing a substance including a reservoir operable to hold a fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, wherein the reservoir includes a diaphragm, and wherein the apparatus to operable to release the fluid within the reservoir upon application of pressure to the diaphragm.

In another embodiment, the present invention is directed to an apparatus for dispensing a substance including a reservoir operable to hold at least one fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, wherein the reservoir includes a diaphragm, wherein the reservoir is connected to at least one nozzle, and wherein the apparatus to operable to spray the at least one fluid via the at least one nozzle within the reservoir upon application of pressure to the diaphragm.

In yet another embodiment, the present invention is directed to a method for dispensing a substance, including providing a wearable device, the wearable device including a reservoir operable to hold a fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, and wherein the reservoir includes a diaphragm, and applying a pressure to at least one surface of the diaphragm in order to release the fluid.

These and other aspects of the present invention will become apparent to those skilled in the art after a reading of the following description of the preferred embodiment when considered with the drawings, as they support the claimed invention.

DETAILED DESCRIPTION

Figure 1:
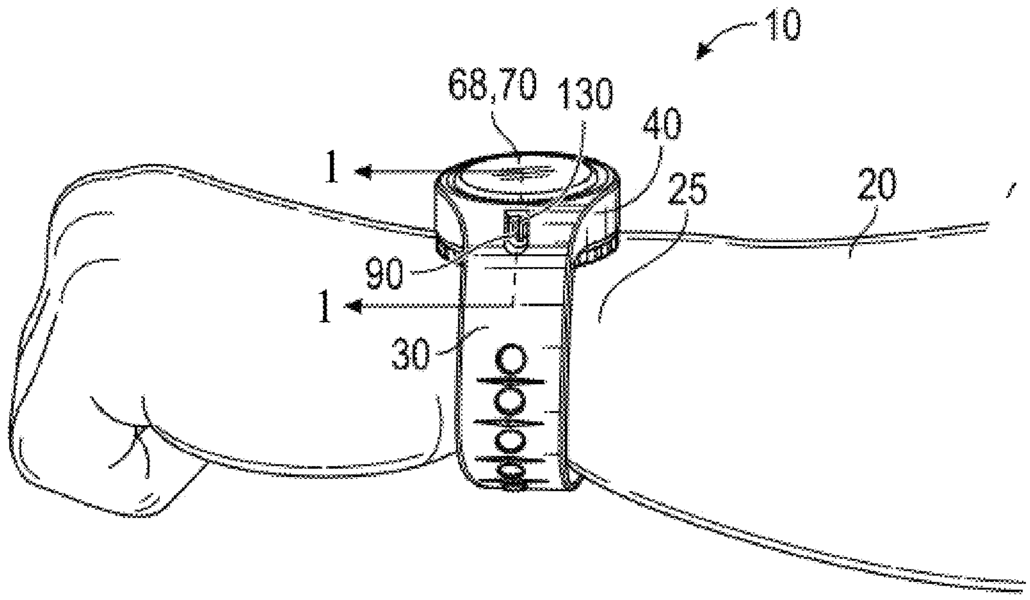
FIG. 1 illustrates a side perspective view of a wearable article for holding and dispensing a suspension and/or a fluid according to one embodiment of the present invention.

The present invention is generally directed to wearable dispensing devices, and more specifically to wearable devices for dispensing hand sanitizer, sunscreen, perfume, and/or other fluids, suspensions, colloids, or solutions applicable to a user's skin.

In one embodiment, the present invention is directed to an apparatus for dispensing a substance including a reservoir operable to hold a fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, wherein the reservoir includes a diaphragm, and wherein the apparatus to operable to release the fluid within the reservoir upon application of pressure to the diaphragm.

In another embodiment, the present invention is directed to an apparatus for dispensing a substance including a reservoir operable to hold at least one fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, wherein the reservoir includes a diaphragm, wherein the reservoir is connected to at least one nozzle, and wherein the apparatus to operable to spray the at least one fluid via the at least one nozzle within the reservoir upon application of pressure to the diaphragm.

In yet another embodiment, the present invention is directed to a method for dispensing a substance, including providing a wearable device, the wearable device including a reservoir operable to hold a fluid, the reservoir having a top surface, a bottom surface, and at least one side wall connecting the top surface and the bottom surface, a cap configured to attach to the reservoir and cover an opening in the bottom surface of the reservoir, at least one strap connected to the reservoir, wherein the strap includes at least one fastening element configured to secure the strap around a wrist of a user, and wherein the reservoir includes a diaphragm, and applying a pressure to at least one surface of the diaphragm in order to release the fluid.

The present application is directed to a wearable, fluid dispensing apparatus. The apparatus is able to quickly dispense a fluid from a reservoir through a dual purpose, two-way valve. The reservoir is air-tight and able to hold a number of different types of fluids, gels, aerosols, and/or other flowable solutions to dispense, such as sanitizers, sunscreens, insect repellants, perfumes, lotions, and medications. Therefore, the apparatus allows users to quickly apply or otherwise use such fluids on the go, without needing to carry another container that is more easily misplaced or that requires extra baggage to carry.

Existing dispensing devices utilize springs, pumps, levers, gears, batteries or pressurized cartridges in order to activate a release mechanism and/or a spray mechanism for the fluid. Advantageously, the present invention overcomes the shortcomings of the prior art via the interaction between a reservoir, a dual-purpose valve, and an airtight cap. The fluid that is discharged from the reservoir via the dual-purpose valve is able to stream at least eight feet through the air due to the ability of the reservoir to distribute pressure applied to the surface of the reservoir to the fluid. In one embodiment of After dispensing, air is sucked back in through the umbrella side of the valve, to repurpose the apparatus. The removable airtight cap allows the apparatus to be easily refilled with no secondary or intermediary devices, and snaps in place, forming an annular seal, to hold over 90 streams in the refillable reservoir. In one embodiment, the reservoir is also made from a transparent and/or translucent material such that a user is able to see the amount of remaining content in the apparatus.

The present invention includes a number of different apparatuses, including those worn on the wrist, on the neck (e.g., as a pendant), on a keychain, attached to the back of a cell phone, and/or attached to other places on a user's body or a user's property. One embodiment of the present invention is able to be placed on the wall for stationary use. Embodiments of the present invention are able to be produced in a variety of sizes, meeting a number of different needs. In one embodiment, for example, a small apparatus is able to be used to clean a part or surface of a part in a difficult to reach area.

In one embodiment, the apparatus further includes at least one Radio Frequency Identification (RFID) chip. In one embodiment, the RFID chip is easily rewritable and reprogrammable. Merchants and other companies are making increasing use of RFID chips to initiate touchless transactions, access certain areas of buildings, track users, detect location within a geofence, and other purposes. Therefore, the present invention increases the ease of complying with such technology.

The apparatus of the present invention is made to use a small number of working parts to increase ease of use and ease of manufacturing and is made to not require any intermediary refilling devices, thereby increasing the ease of use of the device. For example, in one embodiment, the device includes no pressurized canisters, pumps, levers, pistons, and/or batteries. In one embodiment, the duckbill-umbrella valve is not attached to the apparatus using any adhesive (e.g., glue) in order to increase ease of manufacturing and reduce risk of potential dissolution of the adhesive. In one embodiment, the apparatus is made from injection-molded parts, such that the apparatus is able to be easily mass produced. In one embodiment, the apparatus includes at least one part made from low-density polyethylene (LDPE). LDPE has the benefit of being able to be made transparent while having resistance to fluids containing alcohol groups and therefore does not have a risk of dissolving over time. Furthermore, LDPE advantageous is able to undergo numerous load cycles of compression and reextension without permanently deforming, meaning that the reservoir is able to be repeatedly pressed to release water for a long duration without the reservoir failing. In another embodiment, the device is made from liquid silicone rubber.

In one embodiment, the reservoir of the apparatus is transparent and/or translucent, such that a user is able to see the amount of remaining content (e.g., fluid) within the apparatus. In another embodiment, the apparatus includes at least one indicator light. In one embodiment, based on the amount of fluid remaining in the apparatus, the at least one indicator light changes colors and/or changes brightness. For example, when the reservoir is fully filled, the at least one indicator light is green, but if the reservoir is empty, the at least one indicator light is red. In another embodiment, based on the amount of fluid remaining in the apparatus, a different number of indicator lights are activated. For example, if the reservoir is fully filled, five indicator lights are activated, if the reservoir is about half-filled, three indicator lights are activated, and if the reservoir is empty, then no indicator lights are activated. In another embodiment, the apparatus is programmed to produce at least one sound when the contents of the reservoir drop below a certain percentage. In yet another embodiment, the reservoir includes at least one digital overlay, producing an image representing the amount of fluid remaining in the apparatus.

The reservoir includes a diaphragm operable to distribute pressure applied to an outside surface of the diaphragm to the contents of the reservoir and to thereby discharge the fluid through an opening in the wall of the reservoir through a valve. As air and fluid escapes from the reservoir, a vacuum is formed, causing air to be sucked back in through the sides of the dual-purpose duckbill-umbrella valve. While existing dispensers utilize various springs, levers or replaceable pressurized containers in order to produce pressure, the present invention is able to produce the pressure by compressing the reservoir itself, thus reducing the number of working parts of the apparatus. In one embodiment, the diaphragm has a thickness of approximately 2.45 mm, such that when a top surface of the diaphragm is pressed, the surface does not distort into the middle of the diaphragm. In one embodiment, each side wall of the diaphragm has a thickness of approximately 0.5 mm. After the top surface is pressed, the side wall of the diaphragm acts as a biasing member, similar to springs, that produces resisting force to allow the diaphragm to return to its original shape as air return through the duckbill-umbrella valve. Therefore, the present invention is able to work without any additional springs or other biasing members.

The present invention is not intended to be limited to applications utilizing a wristband. For example, in another embodiment, a refillable reservoir is snapped into a necklace, a keychain ornament, and/or ankle bracelet.

Referring now to the drawings in general, the illustrations are for the purpose of describing one or more preferred embodiments of the invention and are not intended to limit the invention thereto.

Figure 2:
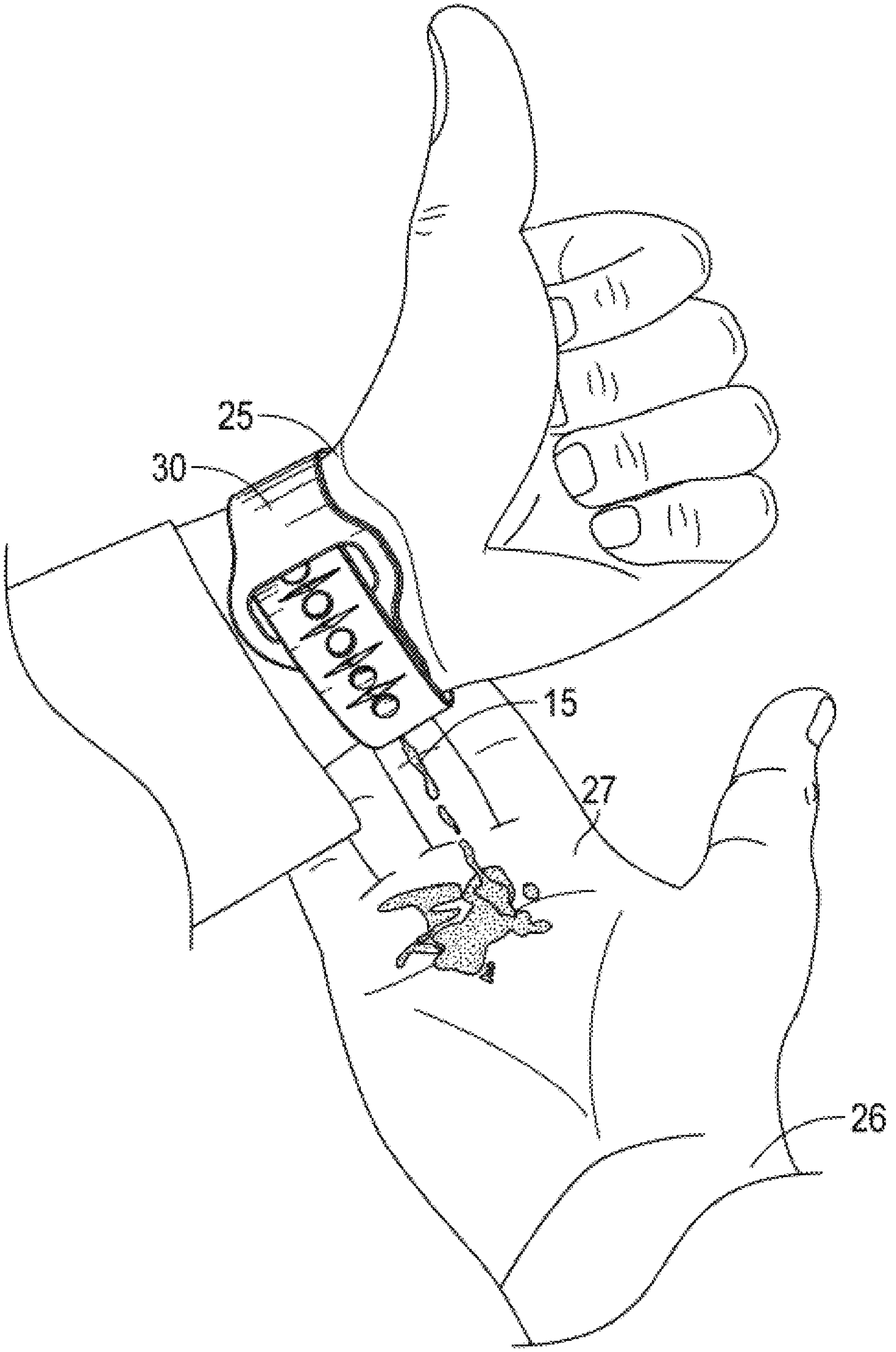
FIG. 2 illustrates a perspective view showing the use of a wearable article for dispensing a suspension and/or a fluid according to one embodiment of the present invention.
Figure 21:
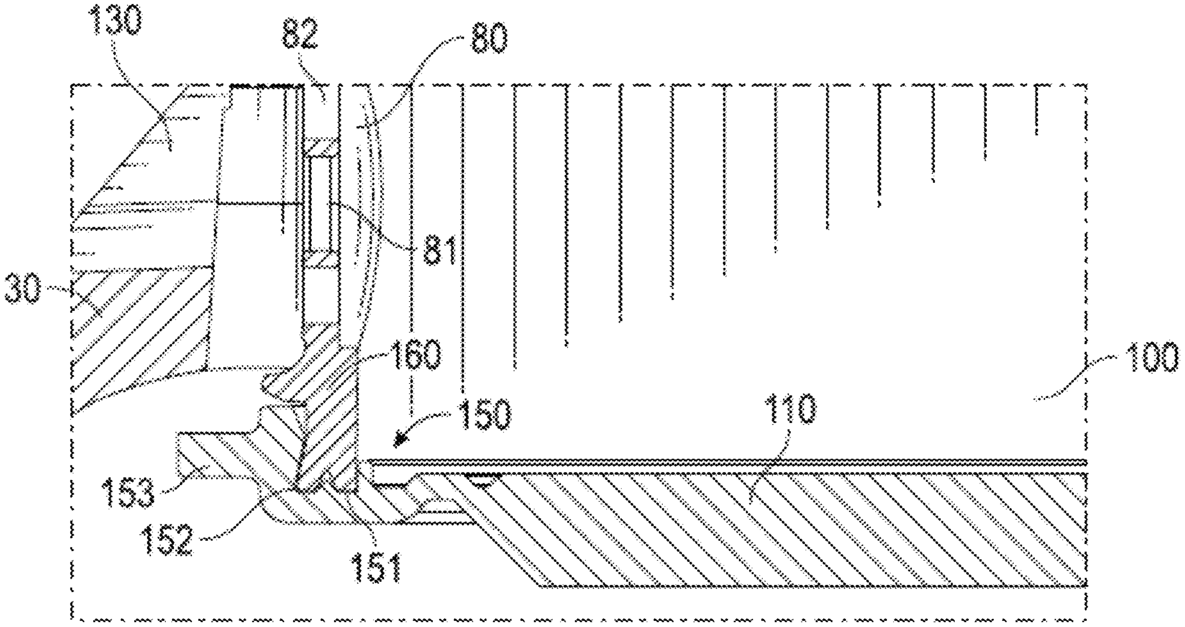
FIG. 21 illustrates an enlarged cross-sectional view of an annular seal for a removable cap of the wearable device of FIG. 1, taken generally along the line 1-1.

FIGS. 1 and 2 illustrate a device 10 for wearing on a wrist 25 of a person 20 and holding and/or dispensing at least one fluid. A line 1-1 defines a cross section of the device 10 for visualizing an annular seal, as shown in FIG. 21. The device 10 includes a wristband 30 that has a central mount 40 and two strap extensions. In a preferred embodiment, the central mount 40 takes the shape of a ring. In another embodiment, the central mount 40 is shaped as a square, rectangle, hexagon, or any other suitable shape. In one embodiment, the wristband 30 is formed from a resilient rubber material, plastic, fabric, and/or leather.

A reservoir is fixed with the central mount 40 of the wristband 30 and has a top side 68, a side wall, and a bottom side. Preferably the side wall takes the shape of the central mount 40 of the wristband 30 for slidable engagement selectively therein. The wristband 30 includes at least one opening 130 adjacent to at least one nozzle 90 connected to the reservoir. The top side 68 includes a resilient pump diaphragm 70. The top side 68, side wall, and bottom side all define an internal volume within the reservoir. A resilient pump diaphragm 70 is preferably made with an elastomeric rubber material, such that depressing the resilient pump diaphragm 70 reduces the internal volume within the reservoir to force the at least one fluid through the at least one nozzle 90. The reservoir is preferably made from a transparent or translucent injection-molded plastic material, such as low-density polyethylene, polyethylene terephthalate (PET), or the like.

Examples of fluids able to be contained within the device include hand sanitizer, soap, sunscreen lotion or gel, cologne, perfume, and/or pepper spray. As mentioned above, in one embodiment, the reservoir is made from LDPE. In one embodiment, the wristband 30 is formed from liquid silicone rubber. Liquid silicone rubber is biocompatible and durable, while also allowing for the addition of colorants to change the aesthetic appearance of the device 10. In one embodiment, the device 10 is able to be colored with one or more colors, including but not limited to clear (uncolored), blue, green, black, red, pink, purple, gray, white, orange, and/or yellow. In another embodiment, the device 10 includes at least one phosphorescent pigment, such that the device 10 is able to glow in the dark. The device 10 is attractive and aesthetically pleasing, and is able to be made in any number of different styles, shapes, and colors, with a wide variety of applied designs such as sports figures, teams, brands, artwork, graphics, or the like.

As shown in FIG. 2, in order to use the device 10, a user is able to raise a wrist 25 wearing the device 10, cup their other hand 27 beneath the apparatus and press the reservoir of the device 10 at the same time, causing the at least one fluid 15 within to spray into the hand 27 cupped underneath. Because the device 10 is preferably used to release the at least one fluid 15 downward into a user's hand 27 or another part of a user's skin, the at least one fluid 15 is positioned nearby the nozzle before release. This allows the device 10 to release a steady stream of the at least one fluid 15 even when the contents of the reservoir are low. Furthermore, because the user's hands are highly likely to cover a sight-line of the at least one fluid 15 being sprayed, the device 10 is able to be used discreetly, such as just before a handshake.

In use, with the at least one fluid 15 in the reservoir, the wristband 30 is secured by a user 20 around the user's wrist 25, such as the user's left wrist 25, as shown in FIG. 1, whereby the wristband is operable to dispense the at least one fluid 15 out of the at least one nozzle into the user's hand 27 when the right thumb of the user 20 depresses the resilient pump diaphragm, as shown in FIG. 2. In addition, the user is able to use their fingers around the far side of their left wrist 25 to depress the resilient pump diaphragm to dispense the at least one fluid 15 out of the at least one nozzle into their hand 27. The present invention is not intended to limit the use of the device 10 on the right wrist 26 or the left wrist 25. Embodiments are able to be formed that are specifically adapted for right-handed or left-handed users.

Figure 3:
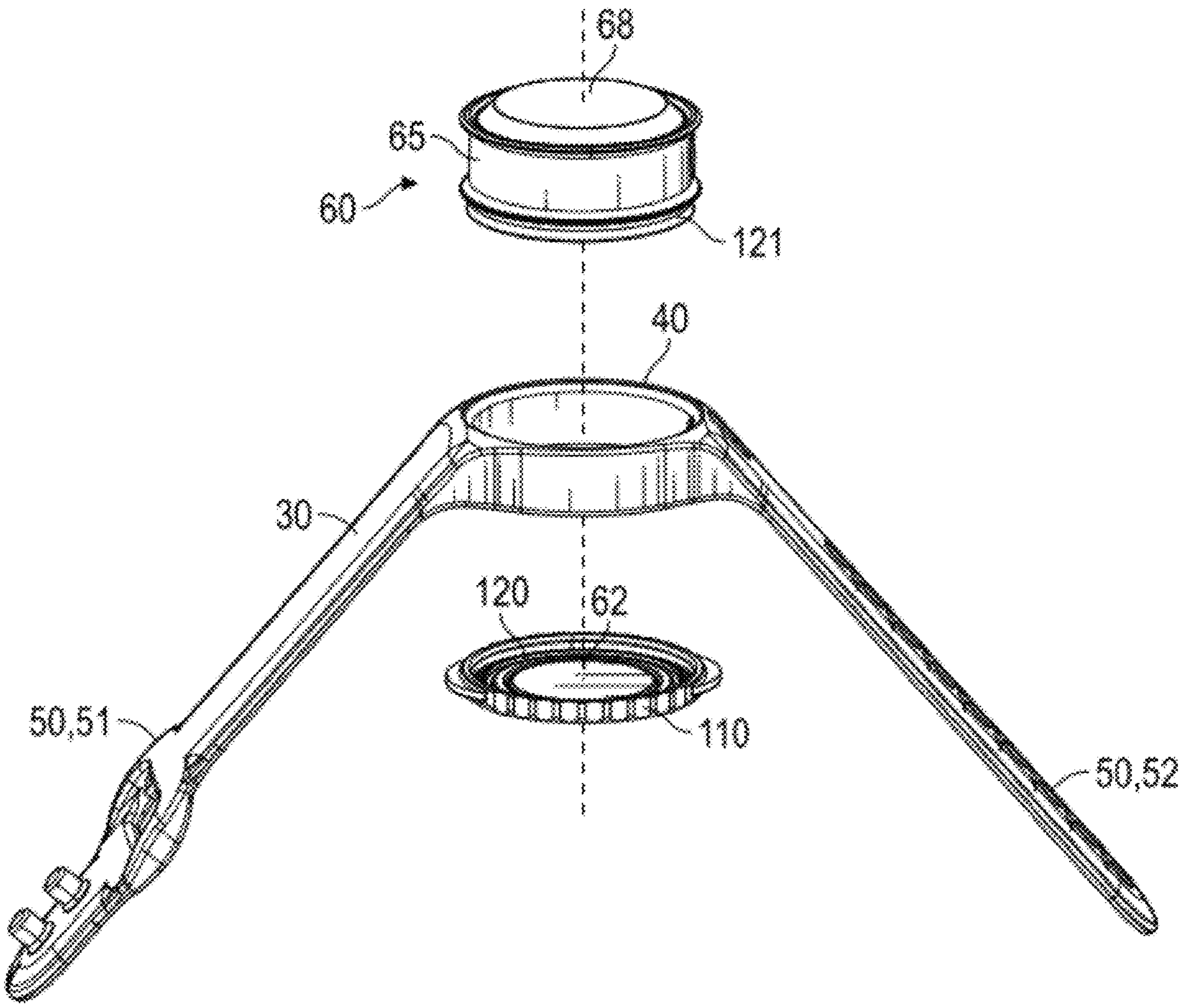
FIG. 3 illustrates an exploded perspective view of a wearable article for holding and dispensing a suspension and/or a fluid according to one embodiment of the present invention.

FIG. 3 illustrates an exploded perspective view of a wearable article for holding and dispensing a suspension and/or a fluid according to one embodiment of the present invention. A reservoir 60 is fixed within the central mount 40 of the wristband 30 and has a top side 68, a side wall 65, and a bottom side 62. The bottom side 62 of the reservoir 60 preferably includes a removable cap 110 that is detachable from the reservoir 60 to provide access to the internal space for refilling the container 60 with the fluid. In one embodiment, the removable cap 110 is designed to snap into place (e.g., via screw threading 120 on the removable cap 110 that is mated to screw threading 121 on the reservoir 60), providing an easy indication for when a seal has been formed. In another embodiment, the removable cap 110 is designed to snap into place when pressure is applied to the removable cap 110 against the reservoir 60.

Each strap extension has one part 51,52 of a two-part mechanical fastener 50, such as a belt and buckle arrangement (as illustrated), a mechanical snap arrangement (not shown), a hook-and-loop type fastener arrangement (not shown), or the like. In one embodiment, more than two strap extensions extend from the central mount 40.

Figure 4:
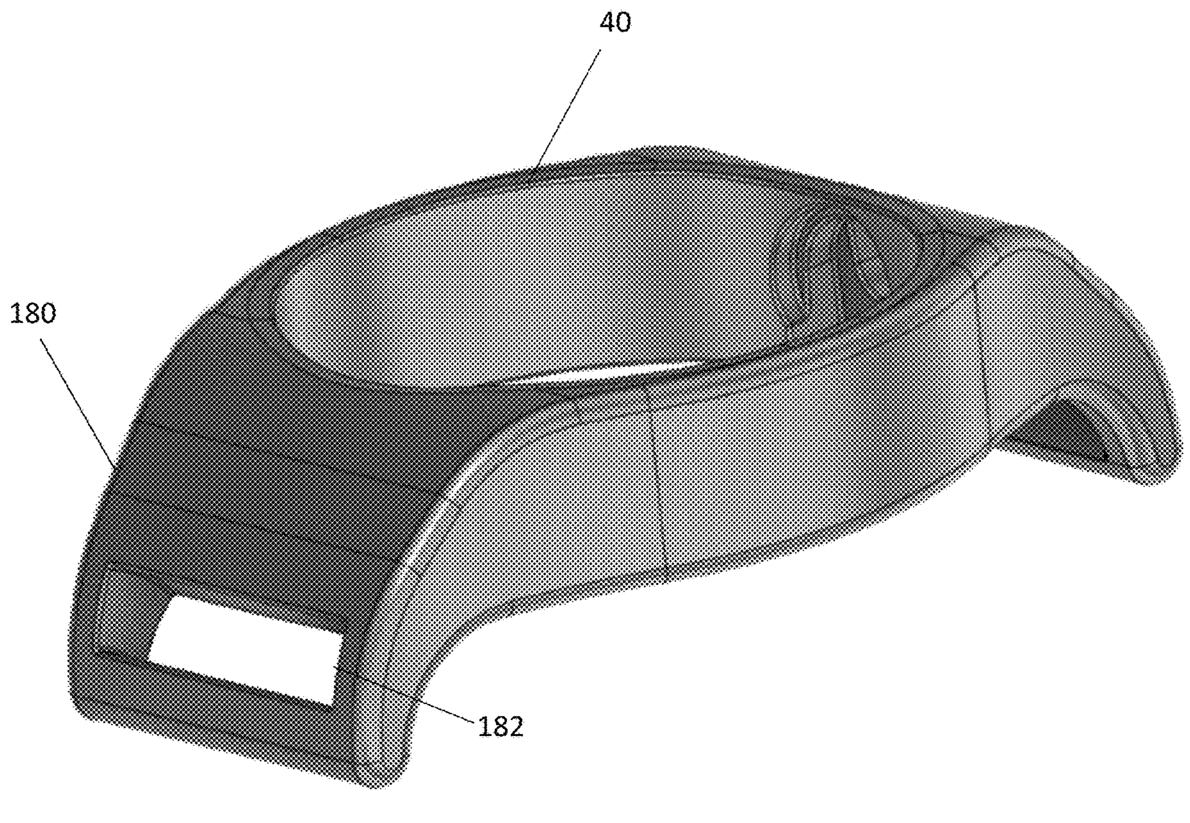
FIG. 4 illustrates an isometric view of a wearable article not having integrally formed straps according to one embodiment of the present invention.

FIG. 4 illustrates an isometric view of a wearable article not having integrally formed straps according to one embodiment of the present invention. In one embodiment, at least one strap holder 180 extends outwardly from the central mount 40. Each of the at least one strap holder includes at least one strap hole 182. The at least one strap hole 182 is operable to accommodate at least one strap, such as, for example, a hook-and-loop fastening strap. The at least one strap is able to wrap around a user's wrist in order to hold the wearable article against the wrist.

Figure 5:
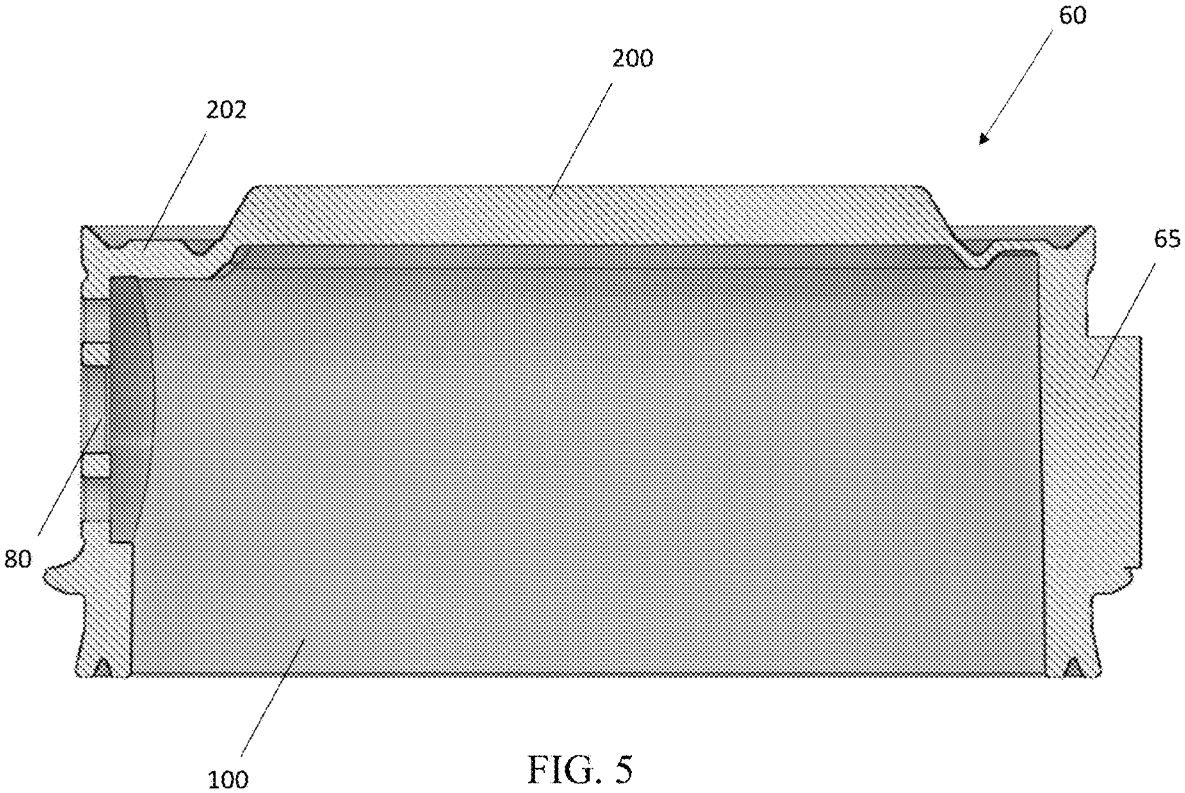
FIG. 5 illustrates a side cross-sectional view of a reservoir for a wearable article according to one embodiment of the present invention.

FIG. 5 illustrates a side cross-sectional view of a reservoir for a wearable article according to one embodiment of the present invention. The reservoir 60 includes a top surface and a side wall 65, which define an interior chamber 100. The top surface has a thicker middle section 200 and a thinner connection section 202, which connects the top surface with the side wall 65. The side wall includes at least one open section 80 for releasing fluid and/or intaking fluid (e.g., through a duckbill umbrella valve). By including a thicker middle section 200 for the top surface, the risk of deformations in the top surface persisting after pressure is applying is reduced. However, the thinner connection section 202 allows the top surface to flex inwardly such that pressure applied to the top surface is able to be alter the volume of the reservoir 60 and thereby increase the pressure on the fluid within. In one embodiment, a removable cap connected to the reservoir 60 also includes a surface with a thicker middle portion and a thinner connection portion.

Figure 6:
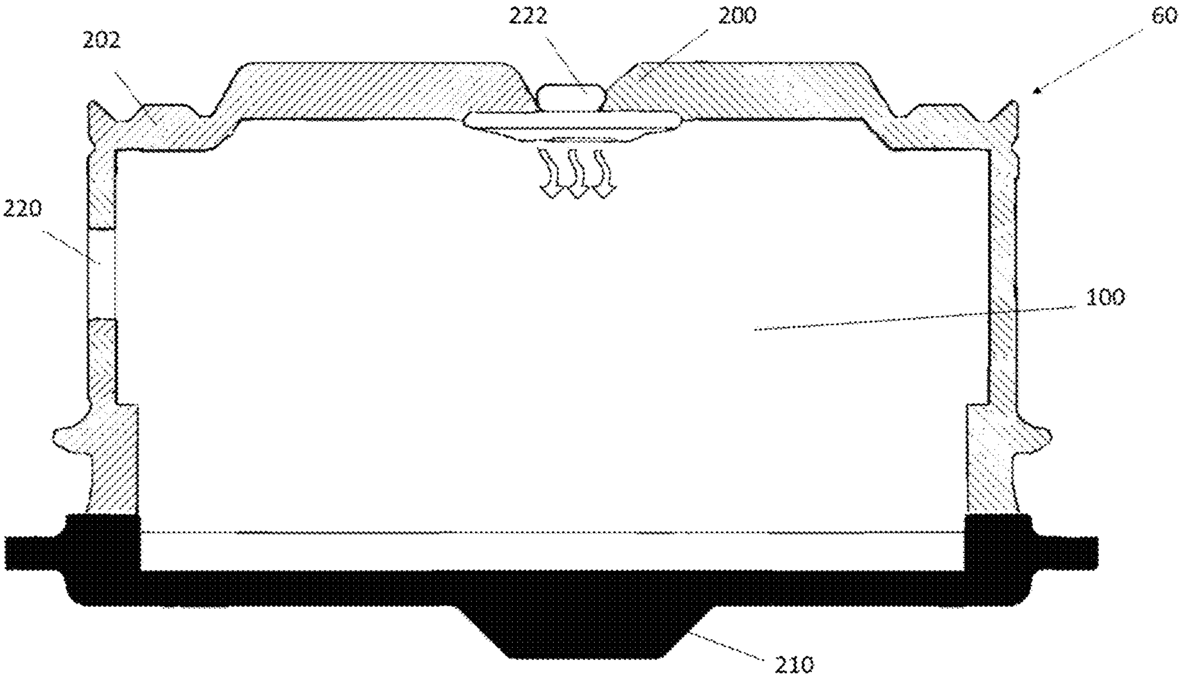
FIG. 6 illustrates a side cross-sectional view of a reservoir having split intake and output valves, with the intake valve in a band of a wearable article, according to one embodiment of the present invention.

FIG. 6 illustrates a side cross-sectional view of a reservoir having split intake and output valves, with the intake valve in a band of a wearable article, according to one embodiment of the present invention. The reservoir includes a top surface and a side wall and is attached to a cap 210, which all define an interior chamber 100. The top surface has a thicker middle section 200 and a thinner connection section 202, which connects the top surface to the side wall. The side wall includes at least one opening 220 for releasing fluid from within the interior chamber 100 when pressure is applied either to the top surface of the reservoir or to the cap 210. In one embodiment, a duckbill valve is inserted into the at least one opening 220 such that the duckbill valve controls release of fluid from the interior chamber 100. In one embodiment, the top surface of the reservoir also includes at least one opening for intaking fluid. In one embodiment, at least one umbrella valve 222 is inserted into the at least one opening in the top surface of the reservoir, such that the umbrella valve 222 controls intake of fluid (e.g., air) into the interior chamber 100.

Figure 7:
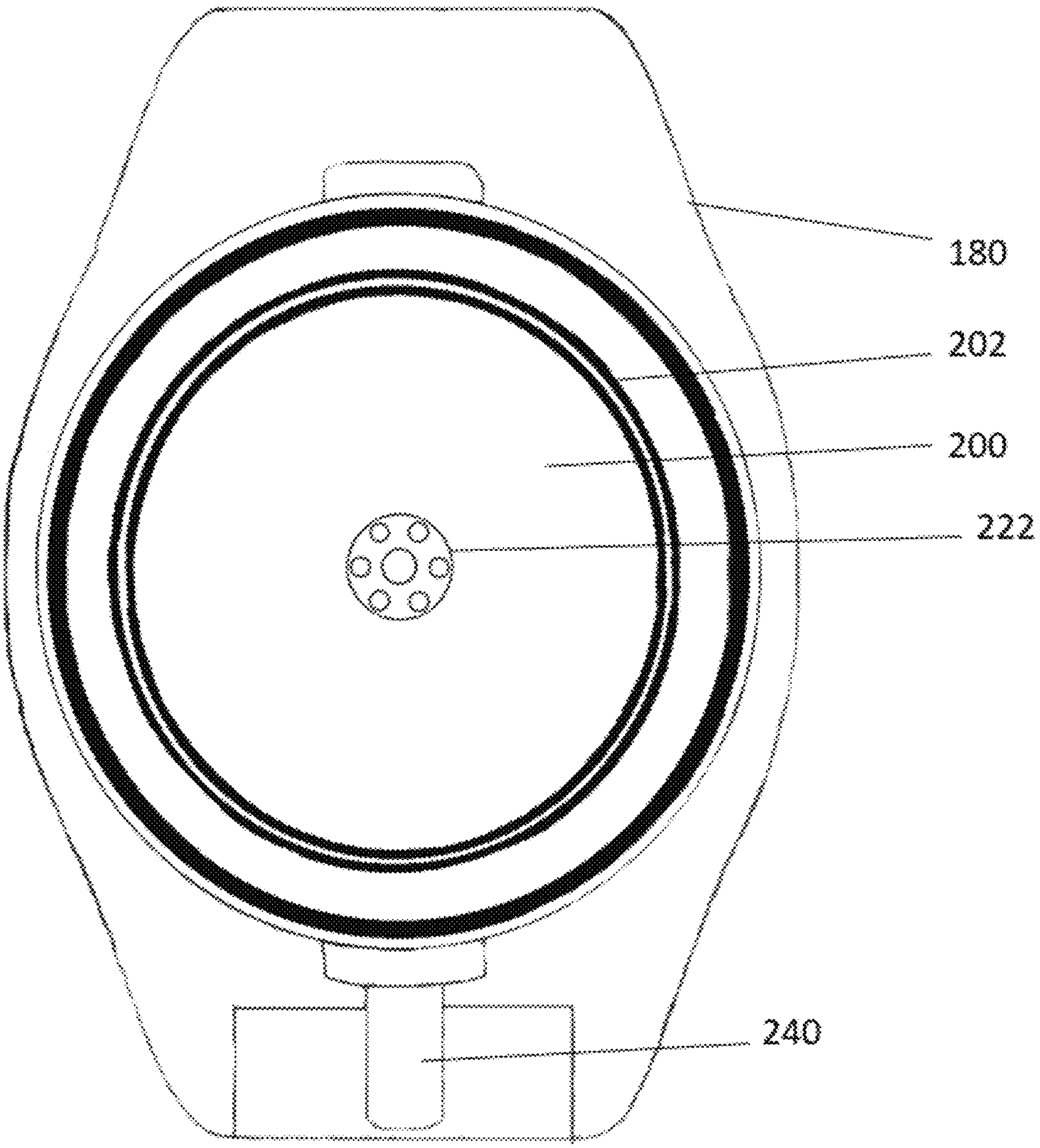
FIG. 7 illustrates a top view of a wearable article having split intake and output valves, with the intake valve in the band of the wearable article, according to one embodiment of the present invention.

FIG. 7 illustrates a top view of a wearable article having split intake and output valves, with the intake valve in the band of the wearable article, according to one embodiment of the present invention. The top surface of a reservoir on the wearable article includes a thicker middle section 200 and a thinner connection section 202, which connects the thicker middle section 200 to a side wall of the reservoir. The thicker middle section of the reservoir includes at least one umbrella valve 222, used to intake fluid (e.g., air) into the reservoir. The wearable article further includes at least one recess 240 in a strap holder 180. The at least one recess 240 is aligned with an output valve (e.g., a duckbill valve) of the reservoir. When fluid is released from the interior chamber of the reservoir through the output valve, it sprays over the recess 240. The recess 240 helps to ensure that the fluid released from the reservoir is not blocked.

Figure 8:
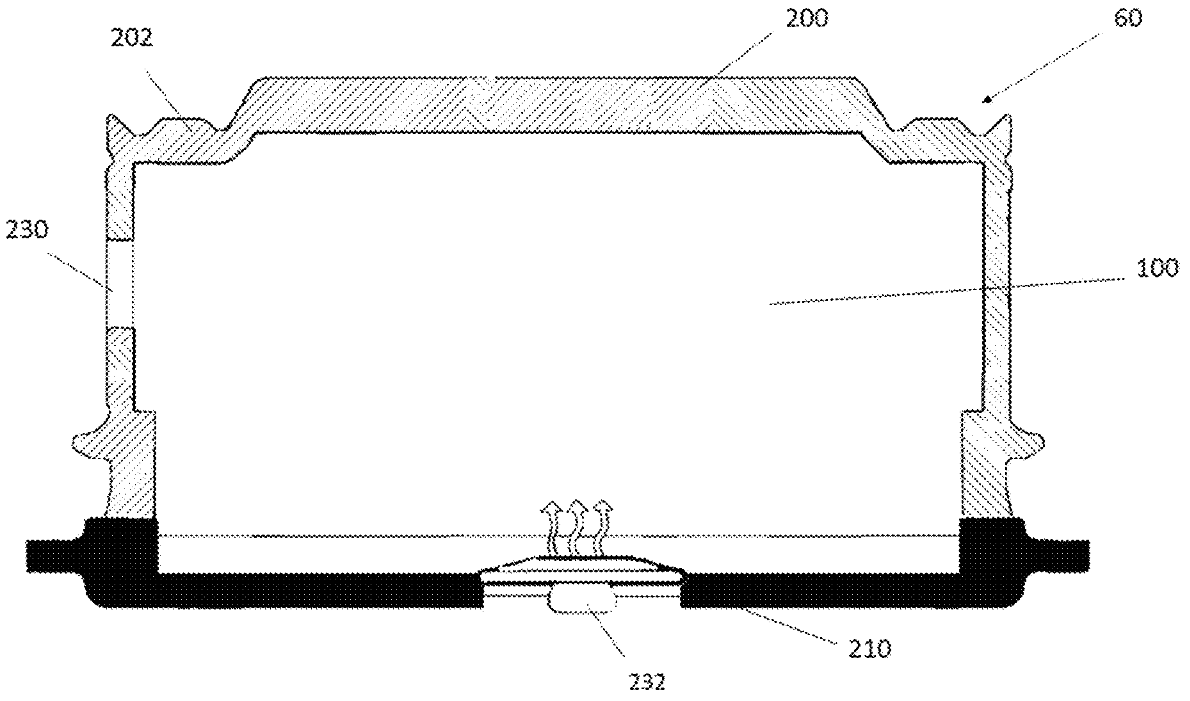
FIG. 8 illustrates a side cross-sectional view of a reservoir having split intake and output valves, with the intake valve in a cap of a wearable article, according to one embodiment, of the present invention.

FIG. 8 illustrates a side cross-sectional view of a reservoir having split intake and output valves, with the intake valve in a cap of a wearable article, according to one embodiment, of the present invention. The reservoir 60 includes a top surface and a side wall and is attached to a cap 210, which all define an interior chamber 100. The top surface has a thicker middle section 200 and a thinner connection section 202, which connects the top surface to the side wall. The side wall includes at least one opening 230 for releasing fluid from within the interior chamber 100 when pressure is applied either to the top surface of the reservoir 60 or to the cap 210. In one embodiment, a duckbill valve is inserted into the at least one opening 230 such that the duckbill valve controls release of fluid from the interior chamber 100. In one embodiment, the cap 210 of the reservoir also includes at least one opening for intaking fluid. In one embodiment, at least one umbrella valve 232 is inserted into the at least one opening in the cap 210, such that the umbrella valve 232 controls intake of fluid (e.g., air) into the interior chamber 100.

Figure 9:
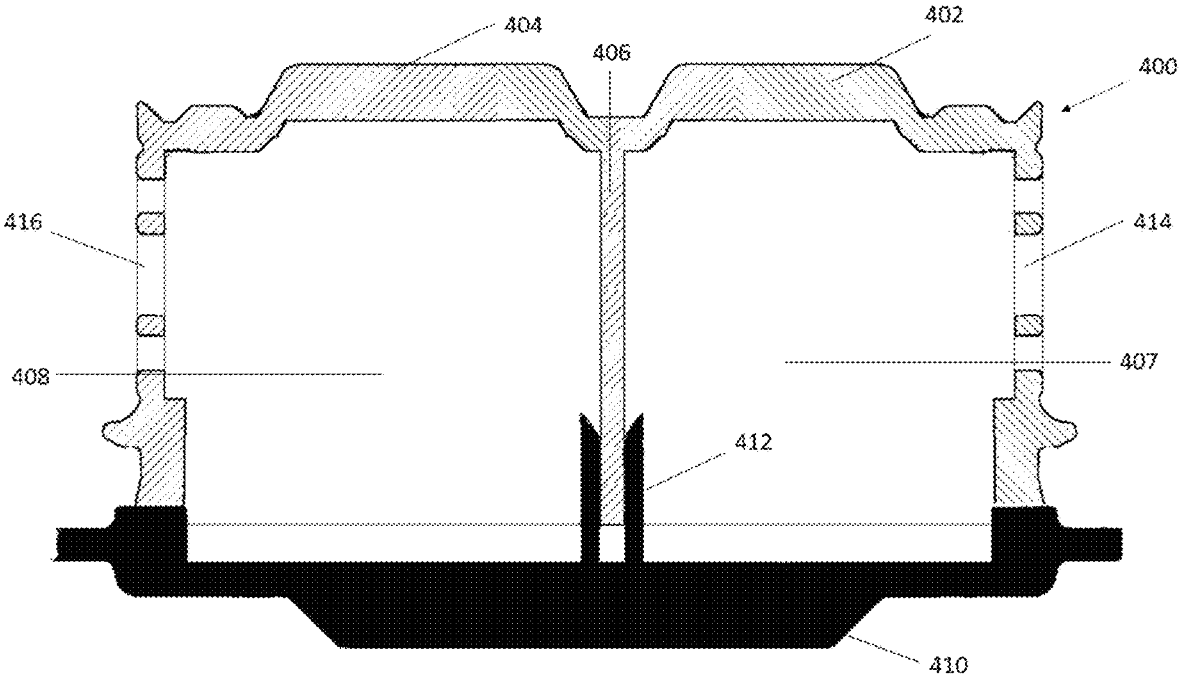
FIG. 9 illustrates a side cross-sectional view of a reservoir having dual chambers, each with unified intake-output valves, according to one embodiment of the present invention.

FIG. 9 illustrates a side cross-sectional view of a reservoir having dual chambers, each with unified intake-output valves, according to one embodiment of the present invention. The reservoir 400 includes a first chamber 407 and a second chamber 408 separated by an internal divider 406, and is attached to a cap 410. In one embodiment, a top surface of the first chamber 407 includes a raised middle section 402. In one embodiment, a top surface of the second chamber 408 includes a raised middle section 404. A side wall of the first chamber 407 includes at least one opening 414. A side wall of the second chamber 408 includes at least one opening 416. In one embodiment, the at least one opening 414 to the first chamber 407 includes a duckbill-umbrella valve configured to control the intake of fluid into and output of fluid from the first chamber 407 upon application of pressure to the raised middle section 402 of the first chamber 407 or the application of pressure to the cap 410. In one embodiment, the at least one opening 416 to the second chamber 408 includes a duckbill-umbrella valve configured to control the intake of fluid into and output of fluid from the second chamber 408 upon application of pressure to the raised middle section 404 of the second chamber 408 or the application of pressure to the cap 410. In one embodiment, the cap 410 includes at least one grip 412, having a plurality of prongs configured to frictionally engage with the internal divider 406 when the cap 410 is attached to the reservoir 400.

Figure 10:
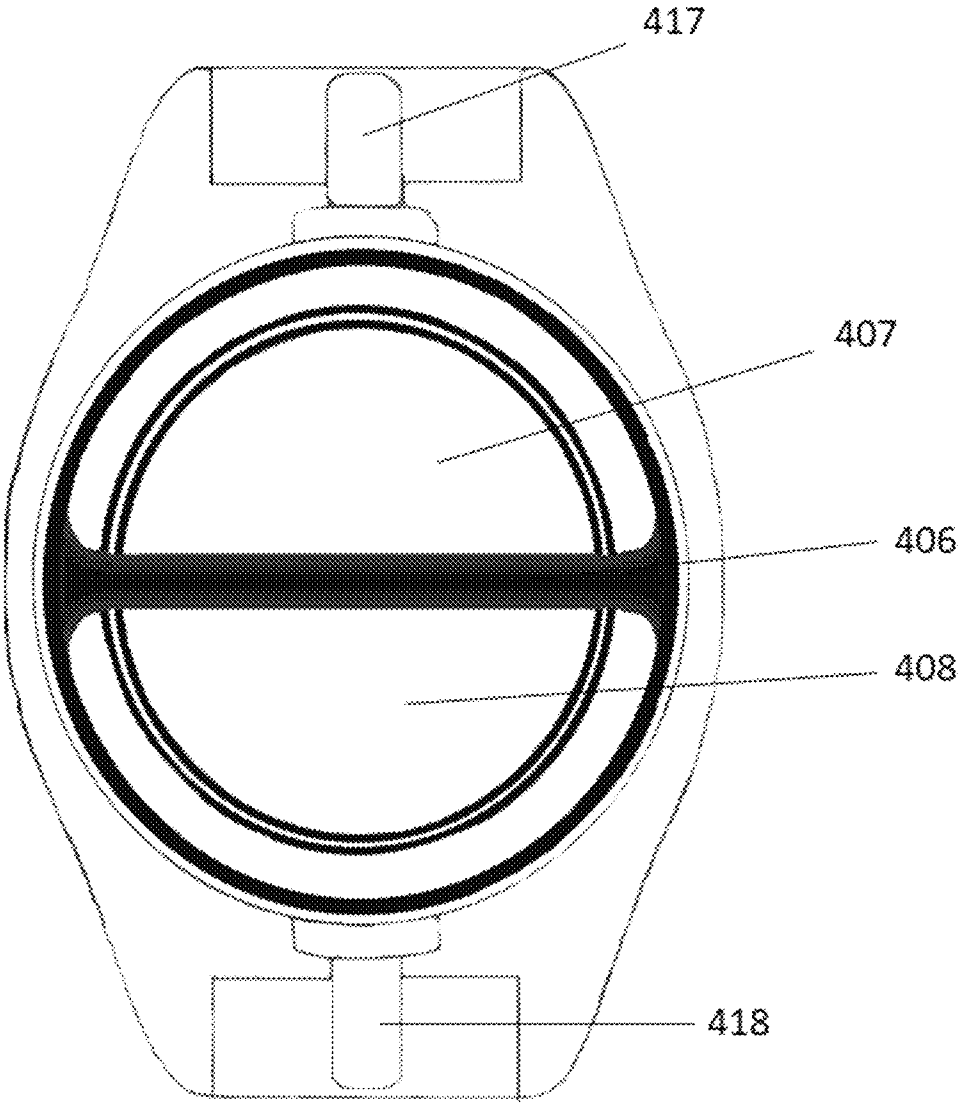
FIG. 10 illustrates a top view of a wearable article with a dual-chamber reservoir according to one embodiment of the present invention.

FIG. 10 illustrates a top view of a wearable article with a dual-chamber reservoir according to one embodiment of the present invention. The wearable article includes a reservoir having a first chamber 407 and a second chamber 408 split by an internal divider 406. The band of the wearable article includes at least one recess 417 adjacent to the first chamber 407 of the reservoir and at least one recess 418 adjacent to the second chamber 408 of the reservoir. In one embodiment, the at least one recess 417 is aligned with at least one opening in a side wall of the first chamber 407, such that fluid released from the first chamber 407 is sprayed over the at least one recess 417. In one embodiment, the at least one recess 418 is aligned with at least one opening in a side wall of the second chamber 408, such that fluid released from the second chamber 408 is sprayed over the at least one recess 418.

Figure 11:
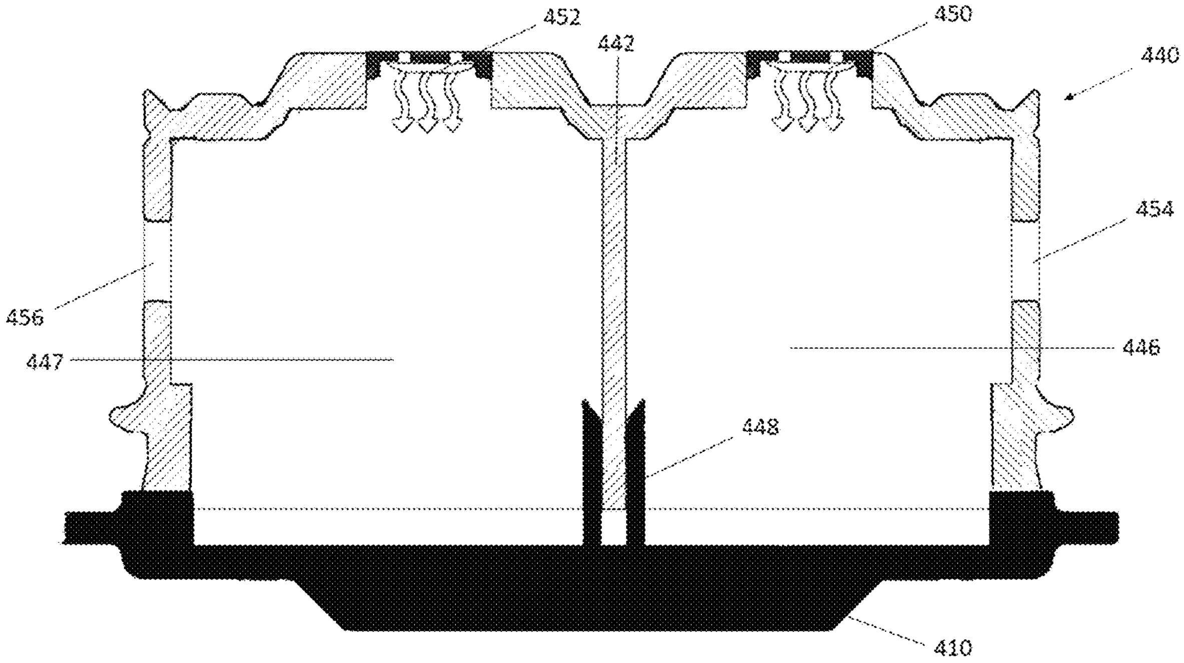
FIG. 11 illustrates a side cross-sectional view of a reservoir having dual chambers, each with split input and output valves, according to one embodiment of the present invention.
Figure 12:
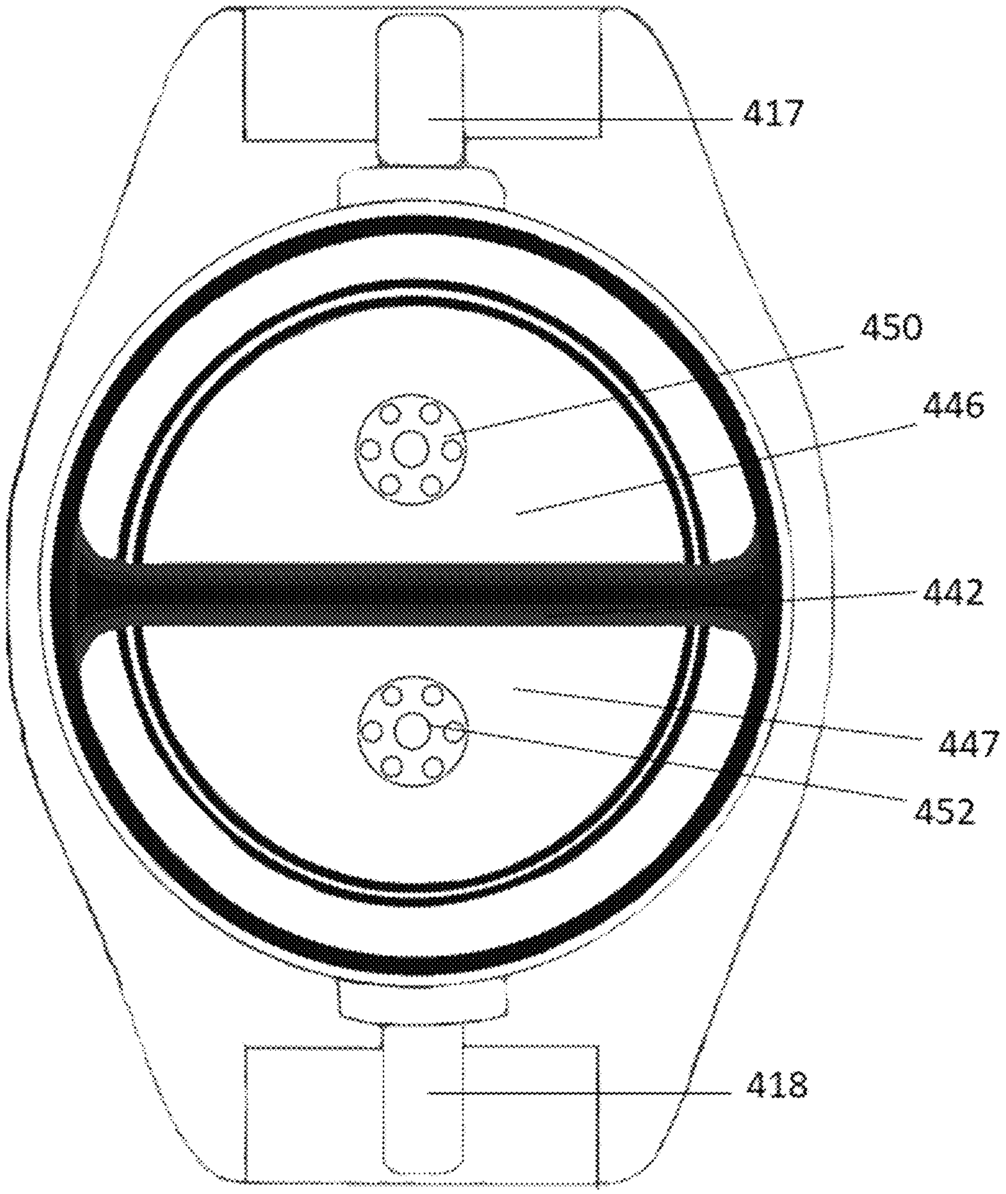
FIG. 12 illustrates a top view of a wearable article with a dual chamber reservoir and split input and output valves according to one embodiment of the present invention.

FIG. 11 illustrates a side cross-sectional view of a reservoir having dual chambers, each with split input and output valves, according to one embodiment of the present invention. The reservoir 440 includes a first chamber 446 and a second chamber 447 separated by an internal divider 442, and is attached to a cap 410. A side wall of the first chamber 446 includes at least one opening 454. A side wall of the second chamber 447 includes at least one opening 456. In one embodiment, the at least one opening 454 to the first chamber 446 includes a duckbill valve configured to control the output of fluid from the first chamber 446 upon application of pressure to a top surface of the first chamber 446 or the application of pressure to the cap 410. In one embodiment, the at least one opening 456 to the second chamber 447 includes a duckbill valve configured to control the output of fluid from the second chamber 447 upon application of pressure to a top surface of the second chamber 447 or the application of pressure to the cap 410. In one embodiment, the top surface of the first chamber 446 includes at least one opening. In one embodiment, at least one umbrella valve 450 is inserted over the at least opening in the first chamber 446, such that the at least one umbrella valve 450 is configured to control intake of fluid (e.g., air) into the first chamber 446. In one embodiment, the top surface of the second chamber 447 includes at least one opening. In one embodiment, at least one umbrella valve 452 is inserted over the at least opening in the second chamber 447, such that the at least one umbrella valve 452 is configured to control intake of fluid (e.g., air) into the second chamber 447. In one embodiment, the cap 410 includes at least one grip 448, having a plurality of prongs configured to frictionally engage with the internal divider 442 when the cap 410 is attached to the reservoir 440. A top view of a wearable article including the reservoir 450 is shown in FIG. 12, having recesses 417, 418 for the release of fluid from each chamber analogous to the wearable article shown in FIG. 10.

Figure 13:
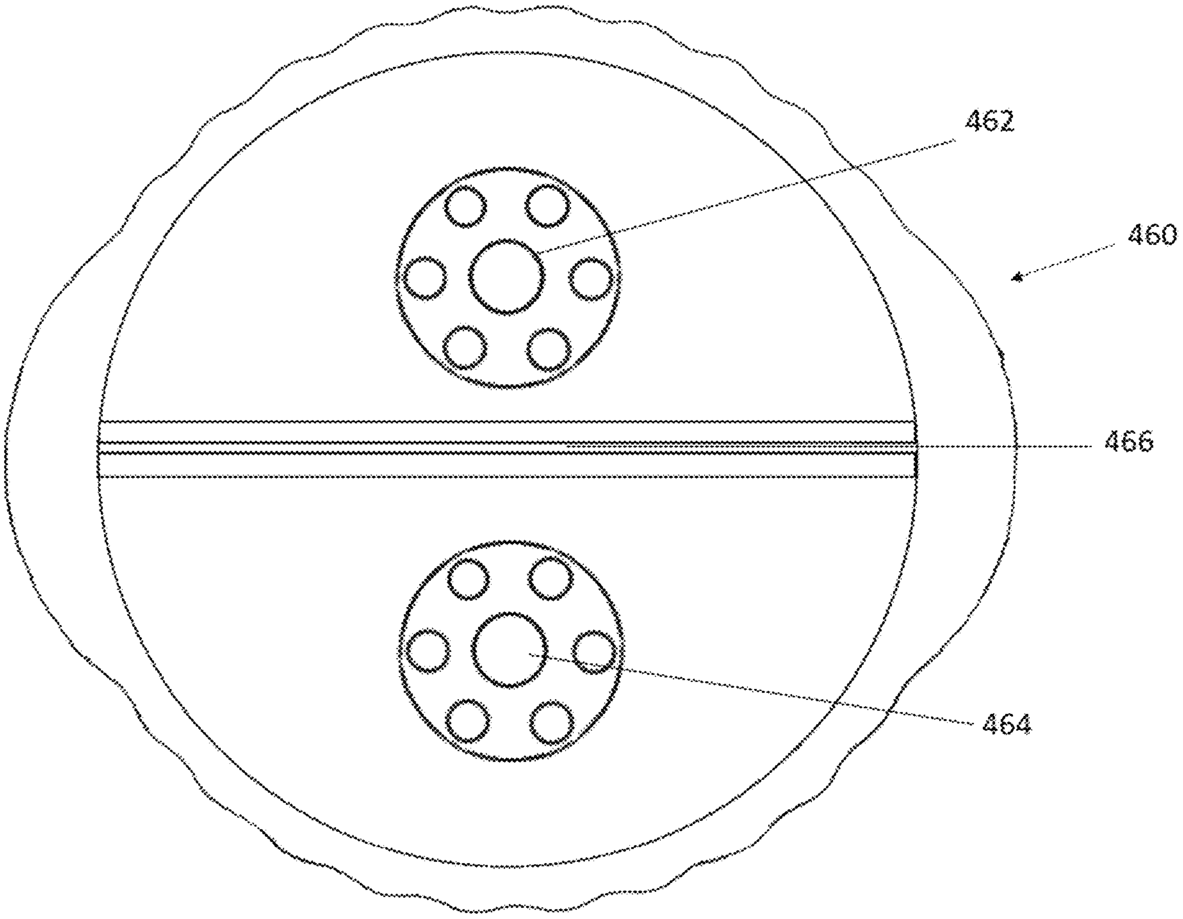
FIG. 13 illustrates a top view of a cap for a wearable article with a dual chamber reservoir and split input and output valves according to one embodiment of the present invention.

FIG. 13 illustrates a top view of a cap for a wearable article with a dual chamber reservoir and split input and output valves according to one embodiment of the present invention. In another embodiment, a cap 460 used to engage with and seal a reservoir includes at least one first opening 462 in a first side and at least one second opening 464 in a second side. In one embodiment, the two sides of the cap 460 are split by a divider 466. In one embodiment, at least one umbrella valve is inserted over the at least one first opening 462 and/or the at least one second opening 464. The at least one umbrella valve facilitates the intake of fluid (e.g., air) into one or more chambers of the reservoir. Fitting the cap 460 with the at least one umbrella valve allows the top surface of the reservoir to have a cleaner look that is desirable according to the tastes of some users.

Figure 14:
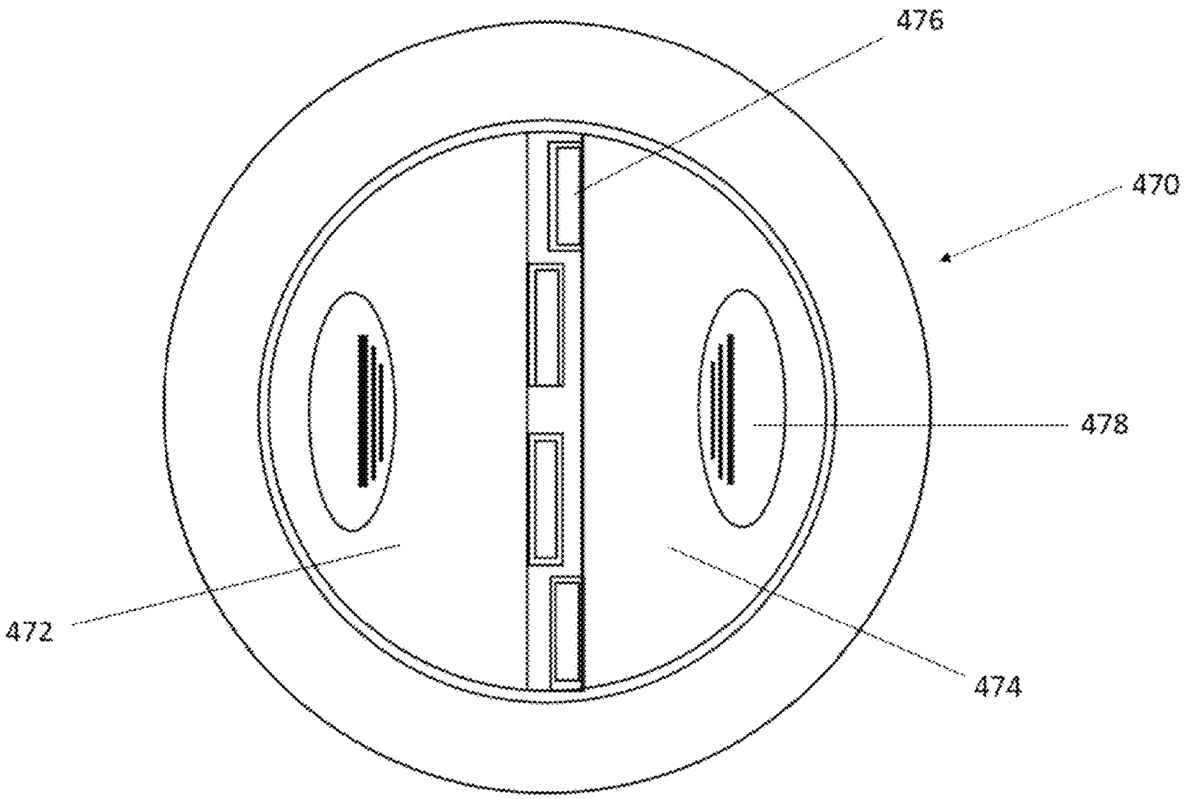
FIG. 14 illustrates a top view of a reservoir for a wearable article including living hinges according to one embodiment of the present invention.

FIG. 14 illustrates a top view of a reservoir for a wearable article including living hinges according to one embodiment of the present invention. In one embodiment, the reservoir 470 includes a first flap 472 and a second flap 474. One or more of the first flap 472 and the second flap 474 are attached to the reservoir 470 via one or more living hinges 476. In one embodiment, the first flap 472 and/or the second flap 474 includes a recess 478 including one or more grip elements, which allows a user to more easily grip and open each flap. The addition of living hinges to a reservoir obviates the need for a cap, as the flaps are able to seal the reservoir 470. Furthermore, as the flaps are directly attached to the reservoir 470, there is a lower risk of losing an essential part of the wearable device, like a detachable cap.

Figure 15:
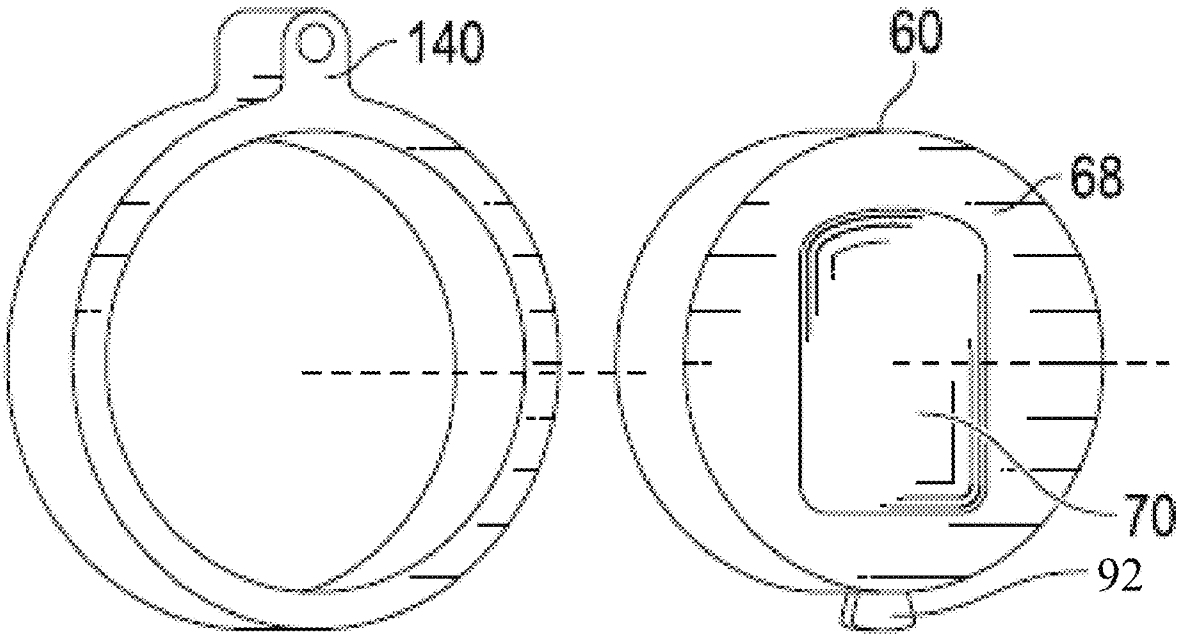
FIG. 15 illustrates a perspective view of a ring base of a wearable article and an insertable fluid reservoir according to one embodiment of the present invention.

FIG. 15 illustrates a perspective view of a ring base of a wearable article and an insertable fluid reservoir according to one embodiment of the present invention. In one embodiment, the present invention includes an auxiliary reservoir mount 140 configured to accept the reservoir 60 therein when the reservoir 60 is removed from the wristband. Examples of auxiliary reservoir mounts 140 include, but are not limited to, a wall bracket, as shown in FIG. 15, a cell phone case, a key ring, and/or a pendant receiver for a necklace. After being removed from the wristband, the reservoir is then able to be inserted within the auxiliary reservoir mount 140. The reservoir 60 is then able to dispense fluid when the resilient pump diaphragm 70 on the top surface 68 is depressed, similar to other wall-mounted hand sanitizer dispensers, but in a much smaller container. The reservoir 60 is able to be removed from the auxiliary wall mount 140 and then added to a wristband via pulling of the tab 92 connected to the reservoir 60. Further, in another embodiment, additional features, such as an RFID tag for using the device as an ID bracelet, are included.

Figure 16:
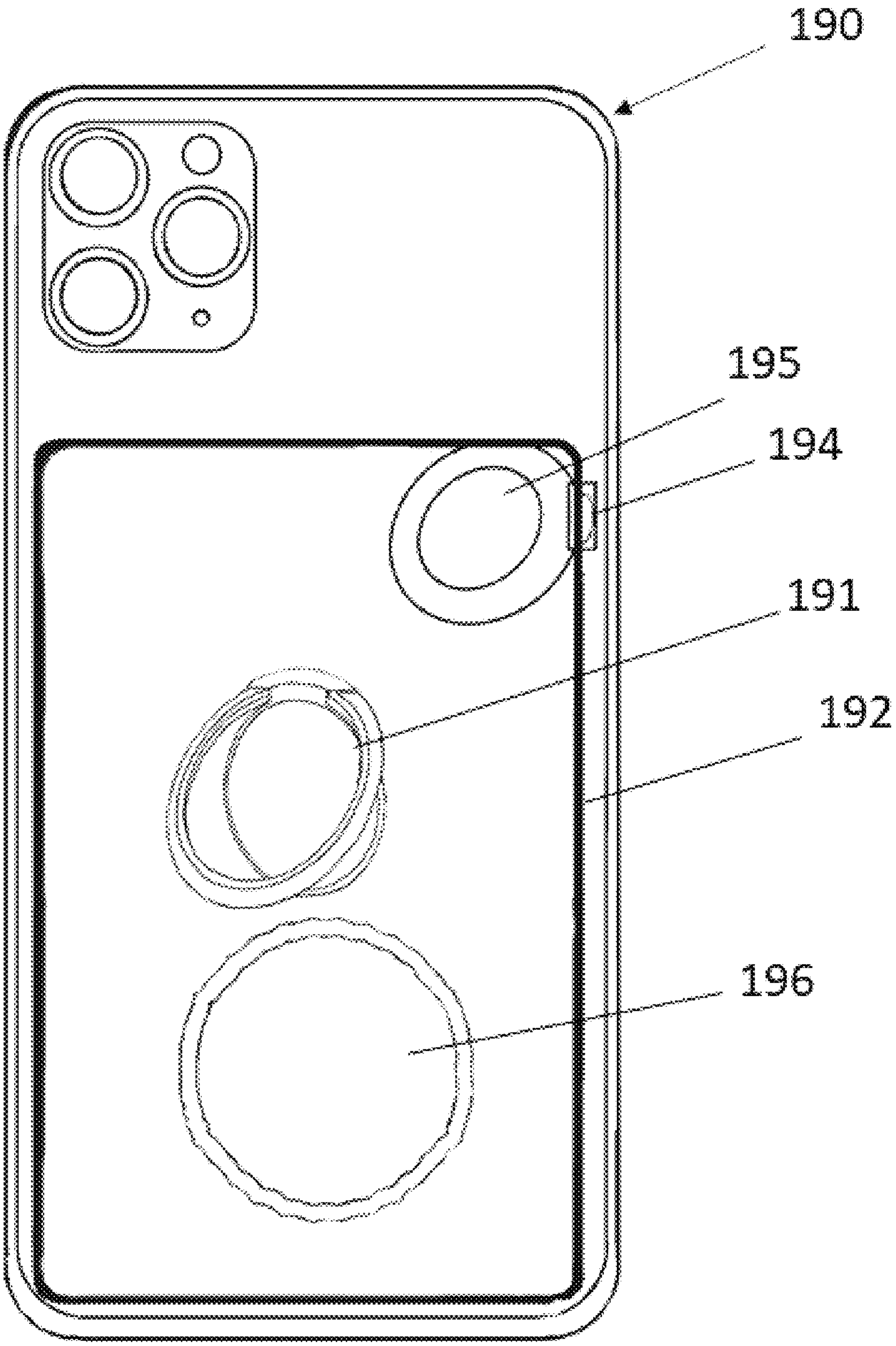
FIG. 16 illustrates a top view of a single-chamber reservoir attached to a phone case according to one embodiment of the present invention.

FIG. 16 illustrates a reservoir attached to a cell phone case according to one embodiment of the present invention. In another embodiment, the present invention includes at least one reservoir attached to the back of a cell-phone case. Cellphones are carried by most of the population and the ability to use a cell phone to dispense fluids such as hand sanitizer, moisturizer, or sunscreen (among other products) provides a great convenience to a user.

In one embodiment, a reservoir 192 is able to attach to the back of a cell phone case 190. When a pressure is applied to a surface of the reservoir 192, the reservoir 192 compresses, causing fluid to be dispensed through a nozzle 194. In one embodiment, the nozzle 194 is a duckbill-umbrella valve.

In one embodiment, the reservoir 192 includes a button 195 extending outwardly from an exterior surface of the reservoir 192. When pressure is applied to the button 195, fluid is dispensed from the reservoir 192 through the nozzle 194. In one embodiment, the reservoir 192 is attached to a cap 196 covering an opening, wherein the cap 196, is removable such that fluid is able to be added and/or removed from the reservoir 192 through the opening when the cap 196 is removed. In one embodiment, the reservoir 192 is attached to a ring 191. In one embodiment, the ring 191 is pivotably attached to a base element attached to the reservoir 192. The ring 191 provides for a user the ability to hold a cell phone in a different way. Additionally, in one embodiment, the ring 191 is able to be used as a cell phone stand, wherein the ring 191 is used to prop up the cell phone.

Figure 17:
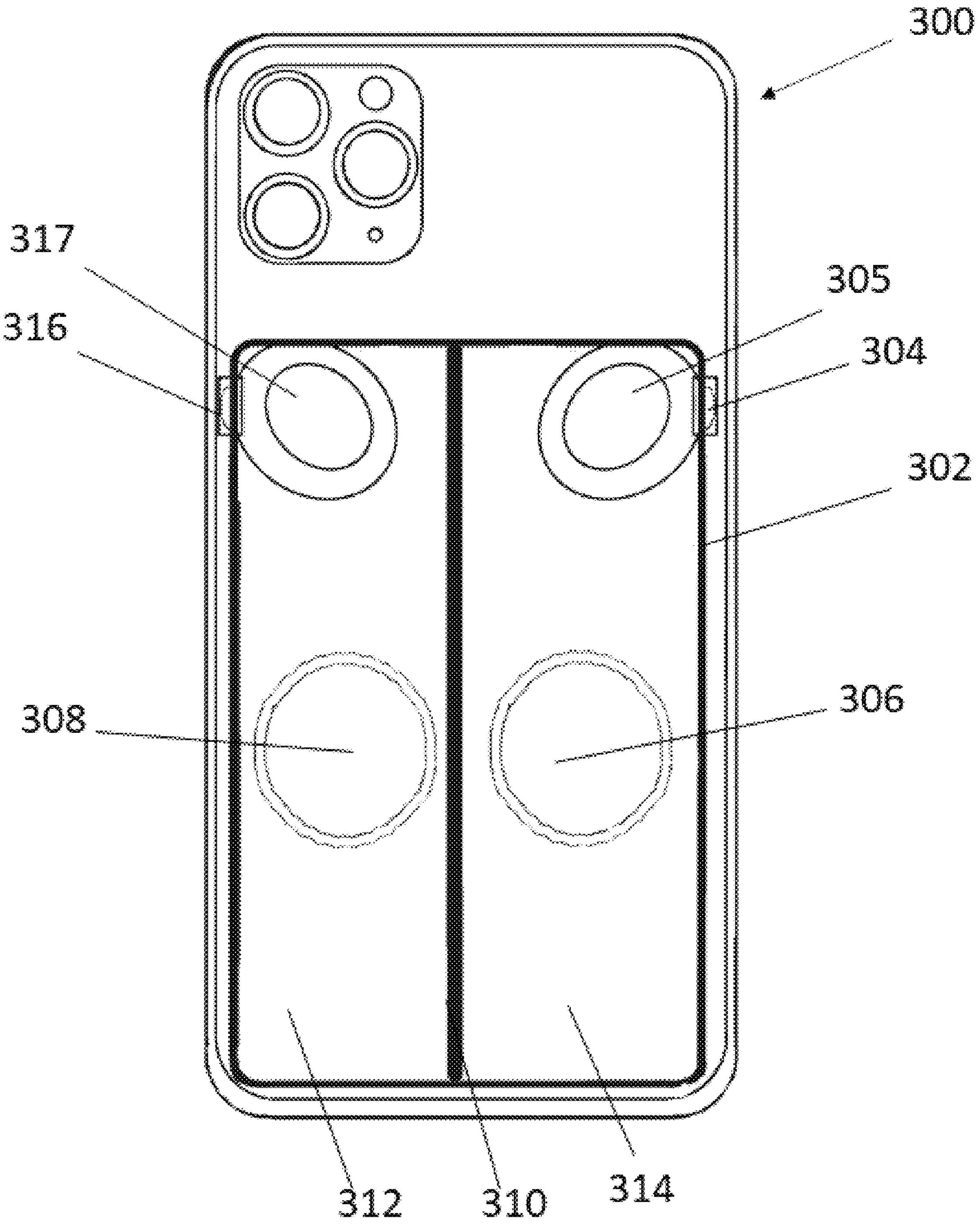
FIG. 17 illustrates a top view of a dual-chamber reservoir attached to a phone case according to one embodiment of the present invention.

In one embodiment, as shown in FIG. 17, a reservoir 302 attached to a cell phone case 300 includes an internal divider 310, which splits the reservoir 302 into a first chamber 312 and a second chamber 314. The first chamber 312 and the second chamber 314 are able to hold the same or different fluids, such that the reservoir 302 conveniently allows for the dispensing of two different types of fluids. The first chamber 312 dispenses fluid through a first nozzle 316, and the second chamber 314 dispenses fluid through a second nozzle 304. In one embodiment, the first chamber 312 includes a first button 317 extending outwardly from an exterior surface of the first chamber 312. When pressure is applied to the first button 317, fluid is dispensed from the first chamber 312 through the first nozzle 316. In one embodiment, the second chamber 314 includes a second button 305 extending outwardly from an exterior surface of the second chamber 314. When pressure is applied to the second button 305, fluid is dispensed from the second chamber 314 through the second nozzle 304.

When pressure is applied to only the surface (or to a button extending outwardly from the surface) of one chamber of the reservoir 302, then only fluid contained in that chamber is dispensed. While FIG. 17 shows the reservoir 302 as being divided by a vertical internal divider 310, one of ordinary skill in the art will understand that the reservoir 302 is also able to be divided by a horizontal divider. Furthermore, one of ordinary skill in the art will understand that the invention is not limited to a reservoir 302 having two chambers, and any number of dividers are able to be used to form a reservoir 302 having any number of chambers according to the teachings of the present invention.

In one embodiment, the reservoir 302 is attached to the cell phone case 300 via sonic-welding, glue, screws, adhesive tape, and/or any other attachment means known in the art. In another embodiment, the reservoir 302 is integrally formed with the cell phone case 300, rather than being attached with an attachment means. In one embodiment, the first chamber 312 of the reservoir 302 is attached to a first cap 308 covering an opening, wherein the first cap 308, is removable such that fluid is able to be added and/or removed from the first chamber 312 through the opening when the first cap 308 is removed. In one embodiment, the second chamber 314 of the reservoir 302 is attached to a second cap 306 covering an opening, wherein the second cap 306, is removable such that fluid is able to be added to and/or removed from the second chamber 314 through the opening when the second cap 306 is removed. In one embodiment, the caps are connected to a corresponding reservoir via click connection and/or turning engagement of threads. In one embodiment, the cap is connected to the reservoir 302 via at least one living hinge. In one embodiment, the reservoir 302 is designed such that there is a smooth transition between the reservoir 302 and the remainder of the cell phone case 300. In one embodiment, the reservoir 302 includes at least one substantially transparent section and/or at least one translucent section, such that the remaining amount of fluid in the reservoir 302 is visible. In another embodiment, the entire reservoir 302 is transparent or translucent.

Figure 18:
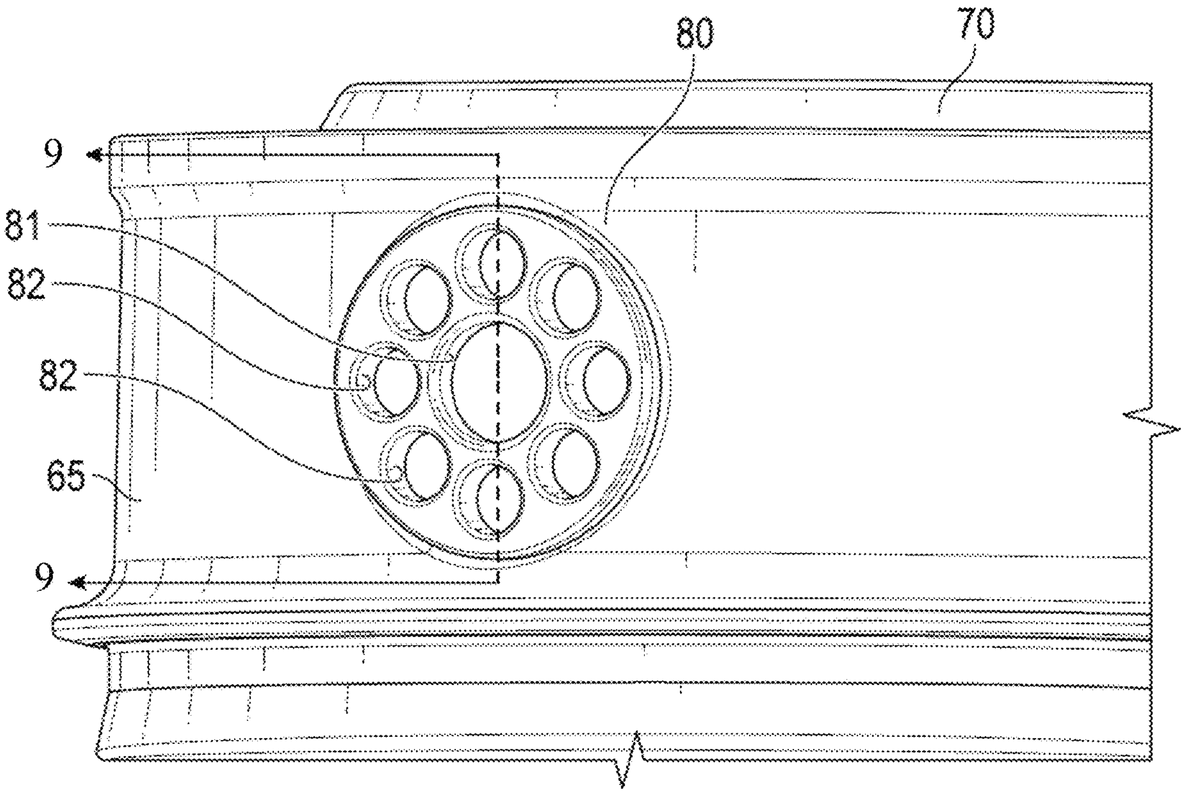
FIG. 18 illustrates an enlarged view of a side opening in a side wall of a wearable article, with nozzle and umbrella valve omitted, according to one embodiment of the present invention.

FIG. 18 illustrates an enlarged view of a side opening in a side wall of a wearable article, with nozzle and umbrella valve omitted, according to one embodiment of the present invention. In one embodiment, an open portion 80 of the side wall 65 of the reservoir preferably includes a central aperture 81 through which a nozzle projects. The open portion 80 further includes a plurality of intake valves 82 through which air re-enters the internal volume when the resilient pump diaphragm 70 returns to a normal position after being depressed to expel the fluid. The line 9-9 defines a cross section of the umbrella valve, which is shown further in FIG. 20.

Figure 19:
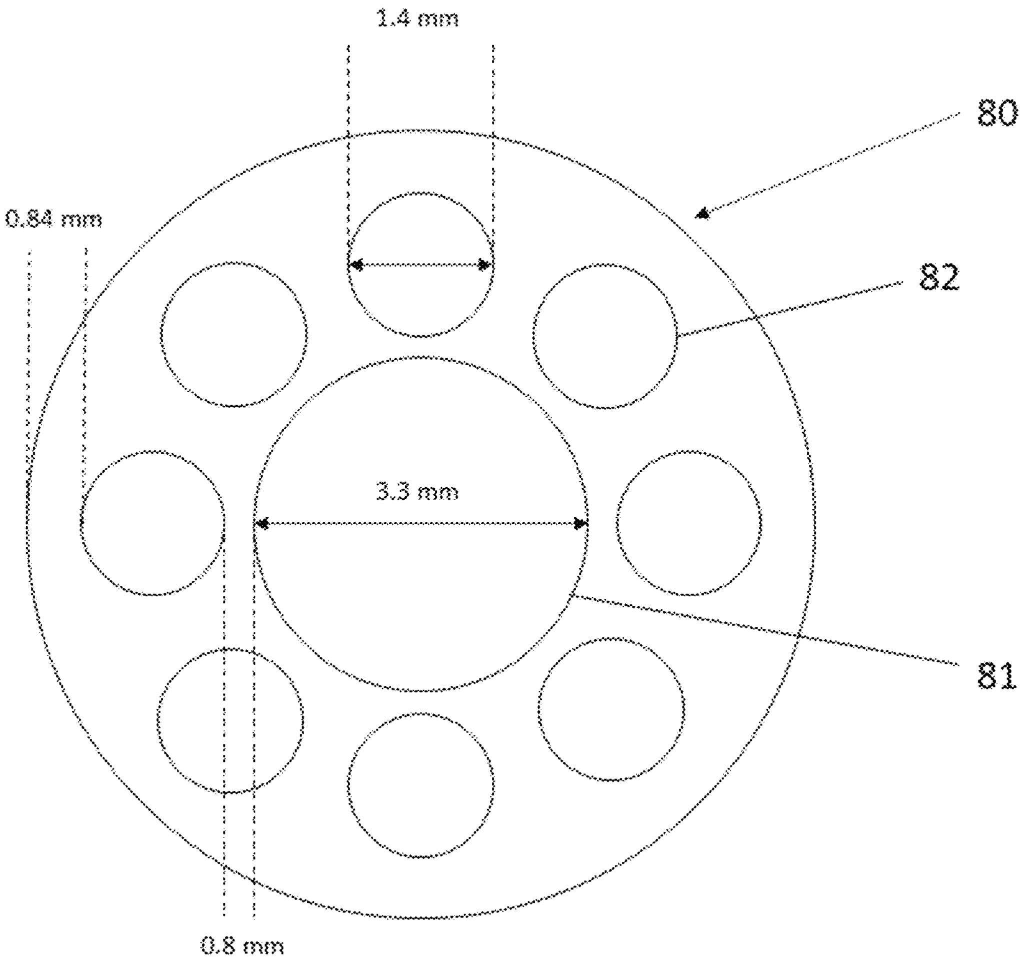
FIG. 19 illustrates an orthogonal side view of a nozzle of a wearable article with dimensions according to one embodiment of the present invention.

FIG. 19 illustrates an orthogonal side view of a nozzle of a wearable article with dimensions according to one embodiment of the present invention. In one embodiment, the intake valves 82 are between about 1 mm and about 2 mm in diameter. In another embodiment, the intake valves 82 are approximately 1.4 mm in diameter. In one embodiment, as shown in FIG. 19, intake valves 82 are positioned approximately equidistant from the central opening in a ring around the central opening. By positioning the closest edge of each of the intake valves 82 approximately 0.8 mm away from the central aperture 81, the intake valves 82 are positioned to intake air to blow open the umbrella valve, while also not leaking the contents of the reservoir. In one embodiment, the intake valves 82 are positioned approximately 0.84 mm away from an outer edge of the nozzle 80. In one embodiment, the central aperture 81 is approximately 3.3 mm in diameter. In one embodiment, the diameter of the nozzle 80 as a whole is approximately 9.4 mm. It is important that the intake valves 82 not be too close to the central aperture 81, nor be too small, as overly small holes are unable to properly let air back into the reservoir and prime the diaphragm for another spray. However, if the intake valves 82 are too large, they are likely to leak over time, causing inconvenient spillage and/or causing the device to be less efficient.

Figure 20:
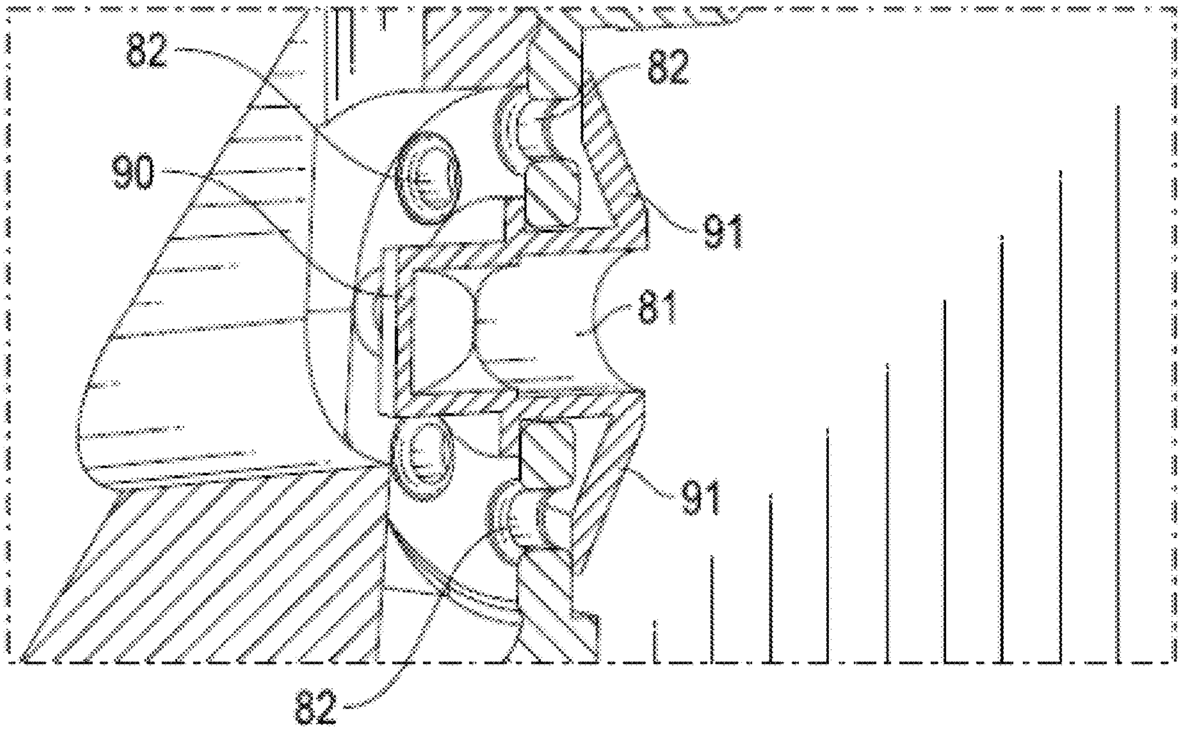
FIG. 20 illustrates an enlarged cross-sectional view of a nozzle and umbrella affixed within the side opening in the side wall of the wearable article of FIG. 18, taken generally along the line 9-9.

FIG. 20 illustrates an enlarged cross-sectional view of a nozzle and umbrella affixed within the side opening in the side wall of the wearable article. The nozzle, or duckbill valve, 90 preferably includes at least one umbrella valve 91. In a resting state, the at least one umbrella valve 91 prevents air or other fluids from passing into the reservoir through the intake valves 82. However, when pressure is applied to the reservoir and fluid is expelled from the reservoir through the nozzle 90 extending through a central aperture 81, the at least one umbrella valve 91 no longer precisely matches the sides of the reservoir, such that the intake valves 82 are no longer fully closed. This is because the reservoir changes geometry when it is compressed, such that the sides push outward. Therefore, when the pressure on the reservoir is relieved, air is drawn in through the intake valves 82, restoring the volume of the reservoir. As air is let back into the reservoir, the resting shape of the reservoir is restored, and the reservoir returns to ambient pressure, causing the at least one umbrella valve 91 to again seal the intake valves 82. In one embodiment, the edges of the intake valves 82 on the inside of the reservoir are substantially flat, meaning that they do not include bezels or any sort of soft transition between the holes of the intake valves 82 and the side wall of the reservoir. Not including bezels or soft transitions helps to prevent potential leakage of the contents of the reservoir through the edges of the air intake valves 82. The at least one umbrella valve 91 and nozzle 90 are preferably integrally formed from an elastomeric rubber material, such as silicone rubber or the like. Advantageously, this means that, in one embodiment, no more than one valve is used to expel fluid from and intake air into the reservoir.

In one embodiment, the apparatus includes a plurality of duckbill-umbrella valves. In one embodiment, including a plurality of duckbill-umbrella valves allows multiple streams of fluid to exit the reservoir simultaneously, increasing the amount of volume expelled with each press. In another embodiment, each of the plurality of duckbill-umbrella valves allow for the release of separate substances. By way of example and not of limitation, in one embodiment, at least one duckbill-umbrella valve allows for the release of hand sanitizer, while at least one other duckbill-umbrella valve allows for the release of sunscreen. In yet another embodiment, at least one duckbill-umbrella valve is used to release a substance within the reservoir, while at least one other reservoir is able to let air into the device to restore the reservoir to its original shape. By separating the air intake valve from the release valve, the device is better able to ensure that the reservoir does not leak while air is being drawn into the reservoir. In one embodiment, the valve gate thickness is approximately 0.7 mm. Including a very thick valve hinders air intake and damages the ability of the diaphragm to effectively flex inward and outward when expelling and taking in air respectively. On the other hand, including a thin valve increases the chances that the valve is unstable and potentially breaks during use.

In one embodiment, the reservoir is divided into a plurality of chambers by at least one internal divider. When the reservoir is closed, the internal divider is operable to seal the contents of each chamber from both the environment outside the reservoir and from each of the other chambers. Because each chamber is substantially separated and sealed from each other chamber, the chambers are able to hold and dispense different substances. In one embodiment, each of the plurality of duckbill-umbrella valves is connected to a different chamber of the reservoir. In one embodiment, a single cap is used to close each of the plurality of chambers of the reservoir. By way of example and not of limitation, in one embodiment, the cap includes hardened and/or recessed regions corresponding to the location of the internal dividers of the reservoir when closed. By segmenting the cap, it is more apparent where pressure is able to be applied in order to dispense liquid from each chamber. In another embodiment, a separate cap is used to close each of the plurality of chambers of the reservoir. In one embodiment, each cap is connected by a living hinge to the reservoir.

Preferably the nozzle 90 is normally closed when the resilient pump diaphragm is not depressed, but under pressure when the resilient pump diaphragm is depressed, the nozzle 90 opens to allow dispensing of the fluid there through, given enough pressure to overcome the resilient force of the nozzle 90 to remain closed.

FIG. 21 illustrates an enlarged cross-sectional view of an annular seal for a removable cap of the wearable device. In such an embodiment, the removable cap 110 preferably includes an annular seal 150 that is formed between a V-shaped rim 151 of a gasket 160 attached to the side wall of the reservoir and a receiver 152 of the removable cap 110. The receiver 152 deforms slightly as the rim 151 of the side wall 65 is pressed into the receiver 152, creating a resilient friction fit that is water tight. In one embodiment, the removable cap 110 includes a tab 153 for aiding a user in removing the removable cap 110 from the reservoir. Including the annular seal allows the reservoir to be air-tight, ensuring that the substance within the interior chamber 100 does not leak. In one embodiment, the annular seal is approximately 35 mm in diameter, approximately matching the diameter of the diaphragm.

The removable cap 110 provides a distinct advantage over prior art systems. Prior art systems generally a needle-nose device to insert substance into a reservoir and/or are otherwise highly limited in the surface area through which substances are able to be added. This creates more substantial difficulty with more viscous substances, such as suntan lotion, which are often difficult to extract and insert using the needle-nose device.

Alternately, the removable cap 110 includes screw threads that engage cooperative screw threads of the side wall of the reservoir, such that the removable cap 110 is able to be selectively screwed to or unscrewed from the reservoir. In another embodiment, the removable cap 110 is connected to the reservoir by a living hinge. Preferably the removable cap 110, or the top side of the reservoir is at least partially transparent, such that a level or amount of the fluid in the reservoir is visually ascertainable.

In a preferred embodiment, the reservoir is removably attached with the central mount of the wristband 30. As such, with the removable cap 110 removed from the reservoir, the reservoir is free to slide out of the central mount of the wristband 30. The central mount of the wristband 30 preferably includes an opening 130 cooperative with the nozzle of the reservoir to allow the fluid to be dispensed through the opening 130 of the wristband 30. In a preferred embodiment, the reservoir and the central mount are cooperatively keyed such that the reservoir only fits into the central mount of the wristband 30 in one orientation, wherein the nozzle is aligned with the opening 130 in the wristband 30. In one embodiment, the wristband 30 includes a cover operable to close the opening 130 to prevent leakage and/or contamination of the contents of the wristband.

Figure 22:
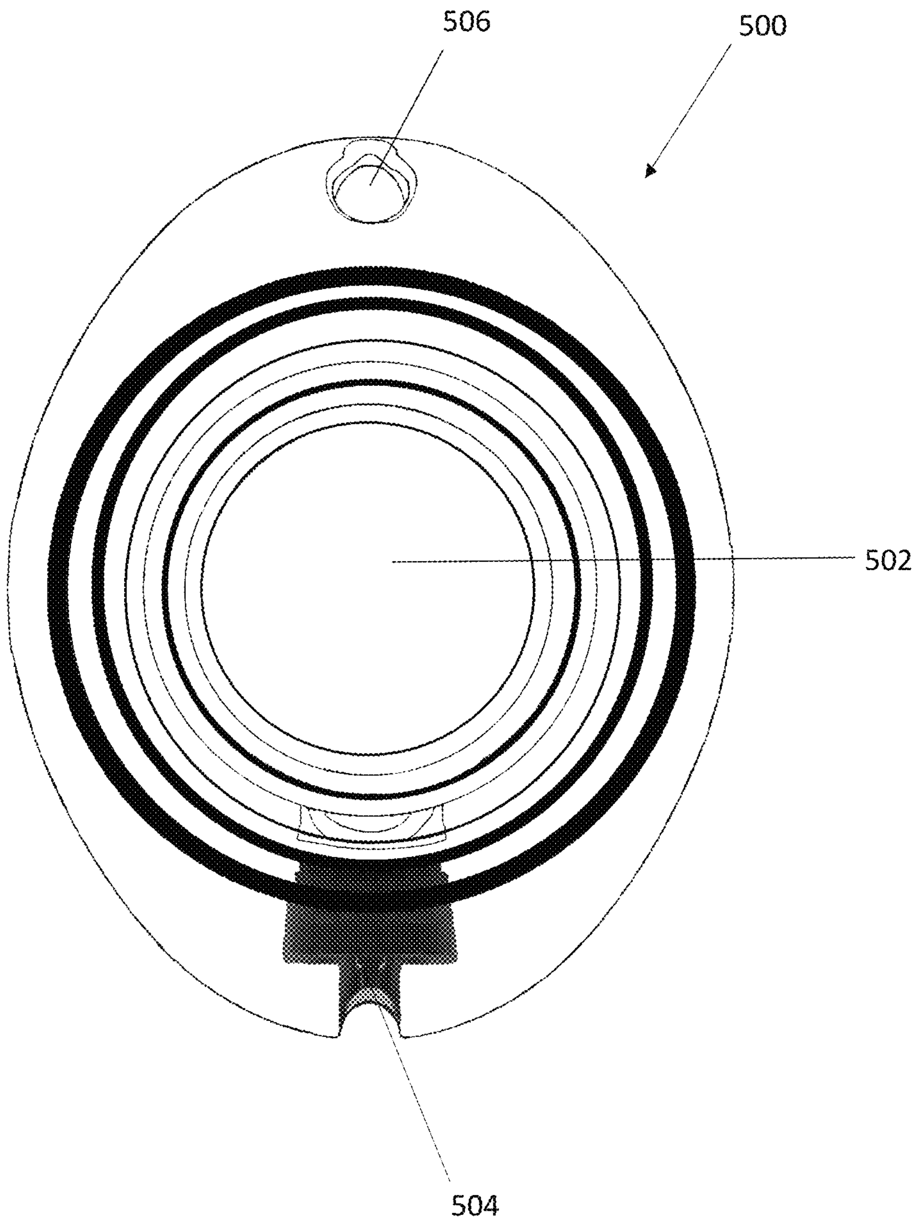
FIG. 22 illustrates a device including a reservoir and a spray nozzle operable to be connected to a keychain according to one embodiment of the present invention.

FIG. 22 illustrates a device including a reservoir and a spray nozzle operable to be connected to a keychain according to one embodiment of the present invention. In one embodiment, a device 500 includes a reservoir 502 connected to a spray nozzle 504 and includes at least one attachment means for connecting to a keychain. In one embodiment, the attachment means is an opening 506 extending through the device 500, such that a keychain is able to be looped through the hole 506.

Figure 23:
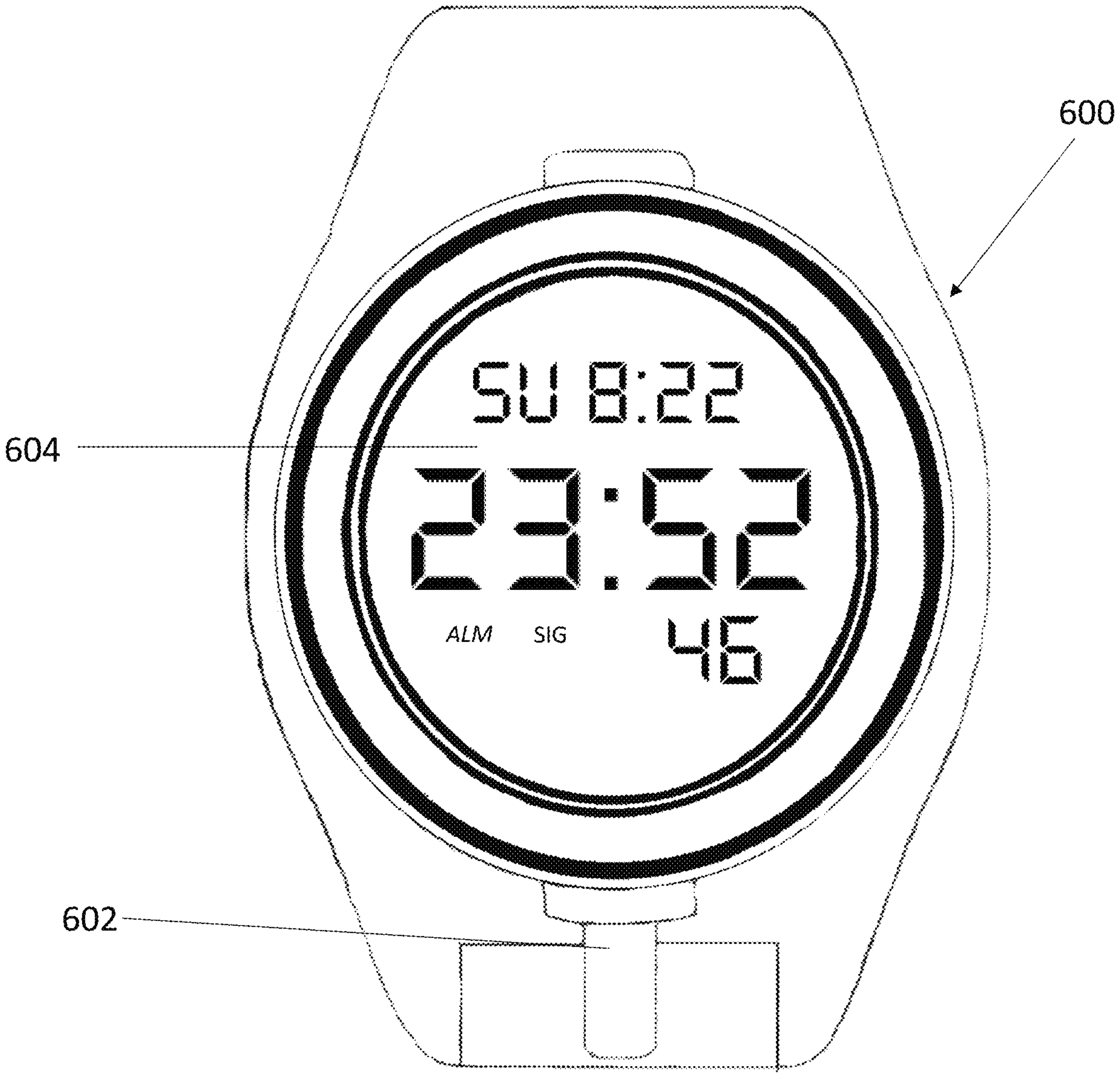
FIG. 23 illustrates a wearable device including a digital display according to one embodiment of the present invention.

FIG. 23 illustrates a wearable device including a digital display according to one embodiment of the present invention. In one embodiment, a watch device 600 includes a digital display 604. In one embodiment, the digital display 604 is connected to a processor, a power source (e.g., a battery, a photovoltaic cell, etc.), and memory within the device. In one embodiment, the digital display 604 is operable to display time, display a date, display a day of the week, set an alarm (e.g., an alarm including a noise, an alarm including a flashing light, etc.) to activate at a specific time, and/or provide an audio and/or visual signal at the end of a set period of time (e.g., a signal every hour). In one embodiment, the digital display 604 is able to display when an alarm and/or an audio and/or visual signal has been set. In one embodiment, the watch device 600 includes a reservoir for containing fluid underneath the digital display 604. In one embodiment, the reservoir is accessible via a removable cap attachable to a side of the watch device 600 opposite that of the digital display 604. The reservoir is connected to a spray nozzle 602 operable to spray fluid from the reservoir.

In one embodiment, the watch device 600 includes at least one body sensor. In one embodiment, the at least one body sensor includes at least one heart rate sensor, at least one blood pressure sensor, at least one sweat sensor, at least one body temperature sensor, at least one analyte sensor, and/or a blood oxygen sensor. In one embodiment, the watch device is operable to generate an alert (e.g., a noise, a visual cue, etc.) when the at least one body sensor detects an abnormal health condition (e.g., high blood pressure, sudden increase in heart rate, etc.).

Figure 24:
FIG. 24 illustrates a wearable device including a digital display according to one embodiment of the present invention.

FIG. 24 illustrates a wearable device including a digital display according to one embodiment of the present invention. In one embodiment, a watch device 610 includes a digital display. In one embodiment, the digital display 614 is connected to a processor, a power source (e.g., a battery, a photovoltaic cell, etc.), and memory within the device. In one embodiment, the display screen is operable to display a time, a date, a day of the week, and/or a remaining battery life. In one embodiment, the watch device 610 is operable to receive a selection of an alarm time and generate a noise and/or a visual cue at the alarm time. In one embodiment, the watch device 610 is operable to receive a selection of a regular signal, including a recurring time period (e.g., every hour) after which the signal will play, and generate a noise and/or a visual cue after the set time period. In one embodiment, the watch device 610 includes a reservoir for containing fluid underneath the digital display 614. In one embodiment, the reservoir is accessible via a removable cap attachable to a side of the watch device 610 opposite that of the digital display 614. The reservoir is connected to a spray nozzle 612 operable to spray fluid from the reservoir.

In one embodiment, the watch device 610 includes a global positioning system (GPS) chip and is operable to generate location data for the watch device 610. In one embodiment, the watch device 610 is operable to display geospatial coordinates (e.g., latitude and longitude), a tide chart corresponding to at least one nearby coastline, a low tide time for the at least one nearby coastline, and/or a high tide time for the at least one nearby coastline. Displaying a tide chart is particularly useful for informing a user of good times to surf or swim nearby. In one embodiment, the watch device 610 is operable to receive weather data from a remote server and display the weather data. In one embodiment, the watch device 610 is operable to generate an alert (e.g., a noise, a visual cue, etc.) at a predetermined time (e.g., 15 minutes, 30 minutes, one hour, two hours, etc.) before weather conditions are set to change (e.g., before a storm starts). An alert particularly helps surfers and swimmers to avoid potentially dangerous conditions while at sea.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Figure 25:
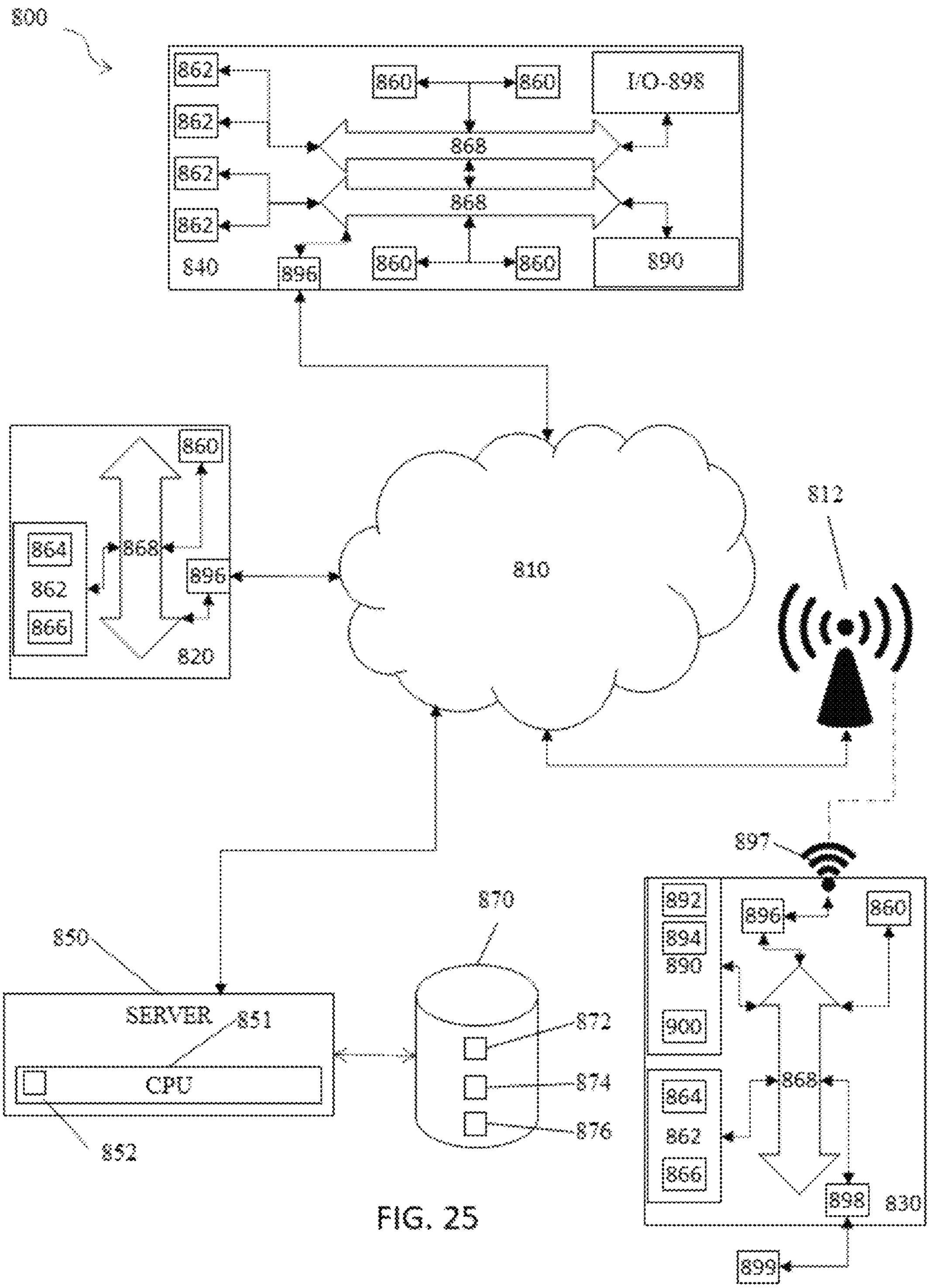
FIG. 25 is a schematic diagram of a system of the present invention.

FIG. 25 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 25, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 25, is operable to include other components that are not explicitly shown in FIG. 25, or is operable to utilize an architecture completely different than that shown in FIG. 25. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. An apparatus for dispensing a substance, comprising:

a reservoir operable to hold a fluid, the reservoir having a top surface, a bottom surface, and at least one side wall connecting the top surface and the bottom surface;

a cap configured to attach to the reservoir and cover an opening in the bottom surface of the reservoir;

at least one strap connected to the reservoir, wherein the at least one strap includes at least one fastening element configured to secure the at least one strap around a wrist of a user;

wherein the reservoir includes a diaphragm;

wherein the apparatus to operable to release the fluid within the reservoir upon application of pressure to the diaphragm; and wherein a side wall of the reservoir includes a central opening, surrounded by a plurality of auxiliary openings.

2. The apparatus of claim 1, wherein the reservoir is connected to at least one nozzle, wherein the apparatus is operable to spray the fluid through the at least one nozzle upon the application of the pressure to the diaphragm.

3. The apparatus of claim 2, wherein the at least one nozzle includes a duckbill-umbrella valve.

4. The apparatus of claim 1, wherein the reservoir is removably attached to a mount, and wherein the mount is attached to the at least one strap.

5. The apparatus of claim 1, wherein the apparatus includes an annular gasket configured to form a seal when the cap is attached to the reservoir.

6. The apparatus of claim 1, wherein an interior surface of the cap includes a plurality of threads, wherein an exterior surface of the at least one side wall of the reservoir includes a plurality of threads, and wherein the plurality of threads on the interior surface of the cap are configured to engage with the plurality of threads on the interior surface of the at least one side wall of the reservoir.

7. The apparatus of claim 1, wherein the reservoir is formed from low-density polyethylene (LDPE).

8. The apparatus of claim 1, wherein the reservoir is substantially transparent.

9. An apparatus for dispensing a substance, comprising:

a reservoir operable to hold at least one fluid, the reservoir having a top surface, a bottom surface, and at least one side wall connecting the top surface and the bottom surface;

a cap configured to attach to the reservoir and cover an opening in the bottom surface of the reservoir;

wherein an interior surface of the cap includes a plurality of threads, wherein an exterior surface of the at least one side wall of the reservoir includes a plurality of threads, and wherein the plurality of threads on the interior surface of the cap are configured to sealingly engage with the plurality of threads on the exterior surface of the at least one side wall of the reservoir;

wherein the reservoir includes a diaphragm;

wherein the reservoir is connected to at least one nozzle; and wherein the apparatus to operable to spray the at least one fluid via the at least one nozzle within the reservoir upon application of pressure to the diaphragm.

10. The apparatus of claim 9, wherein the at least one nozzle includes a duckbill-umbrella valve.

11. The apparatus of claim 9, wherein the reservoir is removably attached to a mount, and wherein the mount is attached to the at least one strap.

12. The apparatus of claim 9, wherein the apparatus includes an annular gasket configured to form a seal when the cap is attached to the reservoir.

13. The apparatus of claim 9, wherein the apparatus includes at least one body sensor, and wherein the at least one body sensor includes at least one heart rate sensor, at least one blood pressure sensor, at least one sweat sensor, at least one body temperature sensor, at least one analyte sensor, and/or a blood oxygen sensor.

14. The apparatus of claim 9, wherein the reservoir is formed from low-density polyethylene (LDPE).

15. The apparatus of claim 9, wherein the at least one strap is formed from at least one silicone rubber.

16. A method for dispensing a substance, comprising:

providing a wearable device, the wearable device including:

a reservoir operable to hold a fluid, the reservoir having a top surface, a bottom surface, and at least one side wall connecting the top surface and the bottom surface;

a cap configured to attach to the reservoir and cover an opening in the bottom surface of the reservoir;

wherein an interior surface of the cap includes a plurality of threads, wherein an exterior surface of the at least one side wall of the reservoir includes a plurality of threads, and wherein the plurality of threads on the interior surface of the cap are configured to sealingly engage with the plurality of threads on the exterior surface of the at least one side wall of the reservoir; and wherein the reservoir includes a diaphragm;

applying a pressure to at least one surface of the diaphragm in order to release the fluid.

17. The method of claim 16, wherein the reservoir is connected to at least one nozzle, further comprising spraying the fluid through the at least one nozzle upon the application of the pressure to the at least one surface of the diaphragm.

18. The method of claim 17, wherein the at least one nozzle includes a duckbill-umbrella valve.

19. The method of claim 16, wherein the reservoir is removably attached to a mount, and wherein the mount is attached to the at least one strap.

20. The method of claim 16, wherein the apparatus includes an annular gasket configured to form a seal when the cap is attached to the reservoir.

* * * * *